United States Patent
Park et al.

(10) Patent No.: US 10,419,171 B2
(45) Date of Patent: Sep. 17, 2019

(54) FLEXIBLE GUARD BAND FOR HETEROGENEOUS SYMBOL LENGTHS/SUBCARRIER SPACING

(71) Applicant: QUALCOMM Incorporated, San Diego, CA (US)

(72) Inventors: Seyong Park, San Diego, CA (US); Hao Xu, Beijing (CN); Wei Zeng, San Diego, CA (US); Jing Jiang, San Diego, CA (US); Joseph Binamira Soriaga, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/659,456

(22) Filed: Jul. 25, 2017

(65) Prior Publication Data

US 2018/0048436 A1  Feb. 15, 2018

Related U.S. Application Data

(60) Provisional application No. 62/373,903, filed on Aug. 11, 2016, provisional application No. 62/373,905, filed on Aug. 11, 2016.

(51) Int. Cl.
*H04L 5/00* (2006.01)
*H04W 52/14* (2009.01)
(Continued)

(52) U.S. Cl.
CPC .......... *H04L 5/0007* (2013.01); *H04L 5/0048* (2013.01); *H04W 52/146* (2013.01);
(Continued)

(58) Field of Classification Search
CPC ... H04L 5/0007; H04L 5/0048; H04W 52/146
See application file for complete search history.

(56) References Cited

U.S. PATENT DOCUMENTS 9,439,161 B2  9/2016  Vermani et al.
2006/0270439 A1  11/2006  Banh et al.
(Continued)

OTHER PUBLICATIONS

LG Electronics: "Discussion on Guard Band Operation for NB-IoT," 3GPP Draft; R1-155797, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 4, 2015,3 pages, XP051039755, Retrieved from the Internet: URL: http://www.3gpp.org/ftp/Meetings_3GPP_SYNC/RAN1/Docs/ [retrieved on Oct. 4, 2015].
(Continued)

*Primary Examiner* — Ronald B Abelson
(74) *Attorney, Agent, or Firm* — Patterson & Sheridan, LLP

(57) ABSTRACT

A BS may transmit a first signal using a first group of one or more tones, transmit a second signal using a second group of one or more tones, and transmit a third signal using a third group of one or more tones in a GB between the first and second groups of tones. In one example, the transmitting comprises controlling a transmit power of at least one tone of the third group of one or more tones in the GB. The at least one tone of the third group of tones is on a different frequency grid than the first group of one or more tones or the second group of one or more tones. A UE may perform corresponding transmit power control operations for UL transmissions in a GB.

26 Claims, 36 Drawing Sheets

(51) Int. Cl.
 *H04B 7/0456* (2017.01)
 *H04L 25/03* (2006.01)
 *H04W 52/24* (2009.01)
(52) U.S. Cl.
 CPC .......... *H04B 7/0456* (2013.01); *H04L 5/001* (2013.01); *H04L 25/03898* (2013.01); *H04W 52/243* (2013.01)

(56) References Cited

U.S. PATENT DOCUMENTS

| | | | |
|---|---|---|---|
| 2006/0280199 A1* | 12/2006 | Lane | H04L 12/43 |
| 2007/0159959 A1* | 7/2007 | Song | H04J 11/00 |
| 2008/0069181 A1 | 3/2008 | Lee et al. | |
| 2011/0105065 A1 | 5/2011 | Sampath et al. | |
| 2011/0235601 A1 | 9/2011 | Yoo et al. | |
| 2014/0133597 A1 | 5/2014 | Hahm et al. | |
| 2015/0098364 A1 | 4/2015 | Hassan et al. | |
| 2015/0256308 A1 | 9/2015 | Ma et al. | |
| 2016/0043830 A1 | 2/2016 | Simon et al. | |
| 2016/0269135 A1 | 9/2016 | Jiang et al. | |

OTHER PUBLICATIONS

Partial International Search Report—PCT/US2017/043916—ISA/EPO—dated Oct. 25, 2017.
International Search Report and Written Opinion—PCT/US2017/043916—ISA/EPO—dated Jan. 4, 2018.

* cited by examiner

FLEXIBLE GUARD BAND FOR HETEROGENEOUS SYMBOL LENGTHS/SUBCARRIER SPACING

CROSS-REFERENCE TO RELATED APPLICATIONS

This application claims benefit of priority from commonly-owned U.S. Provisional Application Ser. No. 62/373,903, filed on Aug. 11, 2016, entitled "FLEXIBLE GUARD BAND FOR HETEROGENEOUS SYMBOL LENGTHS/SUBCARRIER SPACING" U.S. Provisional Application Ser. No. 62/373,905, filed on Aug. 11, 2016, entitled "RESOURCE BLOCK MANAGEMENT FOR HETEROGENEOUS NUMEROLOGY SYSTEMS," which are both expressly incorporated herein by reference in its entirety.

INTRODUCTION

Aspects of the present disclosure relate to wireless communications systems and, more particularly, to transmitting information using a flexible guard band (GB) in a heterogeneous wireless communication system. Correspondingly, aspects refer to receiving information in a GB in a heterogeneous wireless communication system. As described herein, the transmit power of at least one tone transmitted in the GB may be controlled based, at least in part, on the frequency grid used to transmit the at least one tone.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for transmission and reception in a flexible GB for wireless communication systems with heterogeneous numerologies are described herein. Heterogeneous numerology may refer to signals transmitted in the wireless communication systems having a different subcarrier spacing, different cyclic prefix (CP) length, different waveform length, and/or different synchronization in the time domain.

In an aspect, a method for wireless communication is provided. The method may be performed, for example, by a BS. The method generally includes transmitting a first signal using a first group of one or more tones, transmitting a second signal using a second group of one or more tones, and transmitting a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, a method for wireless communication is provided. The method may be performed, for example, by a third UE. The method generally includes receiving information regarding a first signal transmitted by a first UE on a first group of one or more tones, receiving information regarding a second signal transmitted by a second UE on a second group of one or more tones, and transmitting, by the third UE, a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, an apparatus for wireless communication by a BS is provided. The apparatus generally includes means for transmitting a first signal using a first group of one or more tones, means for transmitting a second signal using a second group of one or more tones, and means for transmitting a third signal using a third group of one or more tones in a guard band between the first and second groups of tones, wherein the means for transmitting comprises controlling a transmit power of at least one tone of the third group of one or more tones in the guard band, the at least one tone of the third group of tones being on a different frequency grid than the first group of one or more tones or the second group of one or more tones.

In an aspect, an apparatus for wireless communication by a third UE is provided. The apparatus generally includes means for receiving information regarding a first signal transmitted by a first UE on a first group of one or more tones, means for receiving information regarding a second signal transmitted by a second UE on a second group of one or more tones, and means for transmitting, by the third UE, a third signal using a third group of one or more tones in a guard band between the first and second groups of tones, wherein the means for transmitting comprises controlling a transmit power of at least one tone of the third group of one or more tones in the guard band, the at least one tone of the third group of tones being on a different frequency grid than the first group of one or more tones or the second group of one or more tones.

In an aspect, an apparatus for wireless communication by a BS is provided. The apparatus generally includes at least one processor and a memory coupled to the at least one processor. The at least one processor is generally configured to transmit a first signal using a first group of one or more tones, transmit a second signal using a second group of one or more tones, and transmit a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, an apparatus for wireless communication by third UE is provided. The apparatus generally includes at least one processor and a memory coupled to the at least one processor. The at least one processor is generally configured to receive information regarding a first signal transmitted by a first UE on a first group of one or more tones, receive information regarding a second signal transmitted by a second UE on a second group of one or more tones, and transmit, by the third UE, a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, a computer readable medium storing computer executable code for a base station (BS) is provided. The code may cause the BS to transmit a first signal using a first group of one or more tones, transmit a second signal using a second group of one or more tones, and transmit a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, a computer readable medium storing computer executable code for a third user equipment (UE) is provided. The code may cause the UE receive information regarding a first signal transmitted by a first UE on a first group of one or more tones, receive information regarding a second signal transmitted by a second UE on a second group of one or more tones, and transmit, by the third UE, a third signal using a third group of one or more tones in a guard band between the first and second groups of tones, wherein the transmitting comprises controlling a transmit power of at least one tone of the third group of one or more tones in the guard band, the at least one tone of the third group of tones being on a different frequency grid than the first group of one or more tones or the second group of one or more tones.

In an aspect, a method for wireless communication by a base station (BS) is provided. The BS is configured to transmit a first signal using a first group of one or more tones, transmit a second signal using a second group of one or more tones, and transmit a third signal using a third group of one or more tones in a guard band between the first and second groups of tones, wherein the third signal comprises one or more repetitions of a first symbol, and wherein transmitting the third signal comprises repeating the first symbol until the end of a subframe and transmitting a second symbol using the third group of tones in the guard band in a subsequent subframe.

In an aspect, a method for wireless communication by a base station (BS) is provided. The BS is configured to transmit a first signal using a first group of one or more tones, transmit a second signal using a second group of one or more tones, and transmit a third signal using a third group of one or more tones in a guard band between the first and second groups of tones, wherein the third signal comprises one or more repetitions of a first symbol, wherein transmitting the third signal comprises determining a symbol boundary of the first signal aligns with a symbol boundary of the second signal, and in response to the determination, ceasing transmission of the first symbol and transmitting a second symbol using the third group of tones in the guard band.

In an aspect, a method for wireless communication by a base station (BS) is provided. The BS is configured to transmit a first signal using a first group of one or more tones having a first subcarrier spacing, transmit a second signal using a second group of one or more tones having a second subcarrier spacing, and transmit a third signal using a third group of one or more tones in a guard band between the first and second groups of tones, wherein the third signal comprises one or more repetitions of a first symbol, wherein transmitting the third signal comprises determining the first subcarrier spacing is different than the second subcarrier spacing, and in response to the determination, transmitting the third signal using a subcarrier spacing that is on a same frequency grid as the first and second subcarrier spacings.

In an aspect, a method for wireless communications by a user equipment (UE) is provided. The BS is configured to receive information regarding a first signal transmitted by a first UE on a first set of tones, receive information regarding a second signal transmitted by a second UE on a second set of tones, and transmit, by the third UE, a third signal on a third set of tones, based at least in part on the received information, wherein the third set of tones is between the first set of tones and the second set of tones.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
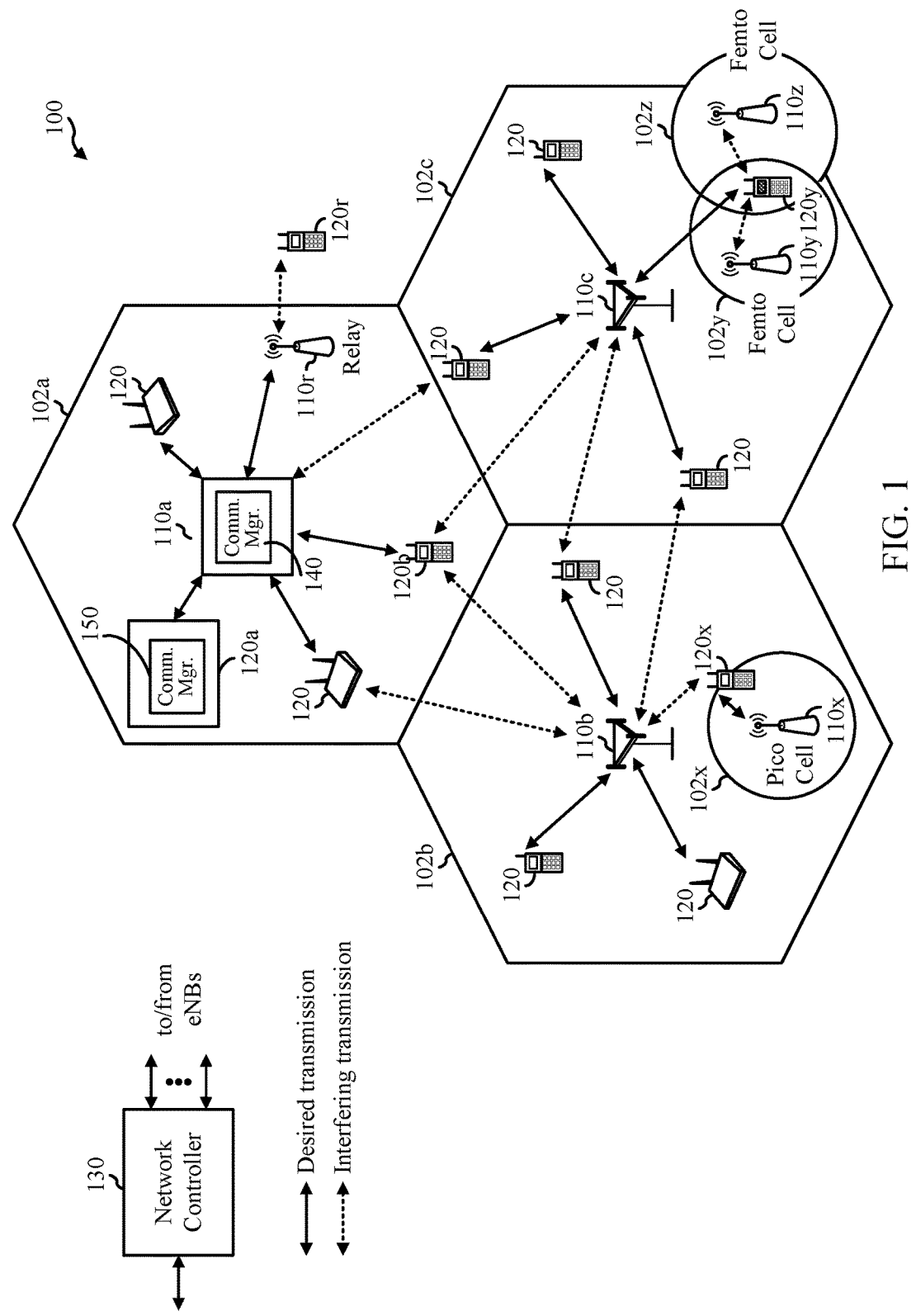
FIG. 1 is a block diagram conceptually illustrating an example telecommunications system, according to aspects of the present disclosure.

Aspects of the present disclosure provide apparatus, methods, processing systems, and computer readable mediums for transmitting using bits of a flexible guard band (GB) in a heterogeneous numerology wireless communication system. A heterogeneous numerology wireless communication system may refer to wireless communication systems in which UEs may be asynchronous. As described in more detail herein, heterogeneous numerology wireless communication systems may refer to systems in which transmitted signals have one or more of a different subcarrier spacing, different cyclic prefix (CP) length, different waveform length, and/or different synchronization in the time domain.

A GB may be used to separate waveforms having a different numerology (e.g., having different symbol lengths); however, GBs may lead to unused spectrum, which is generally a valuable resource. Accordingly, aspects of the present disclosure transmit information using bits of the GB.

The use of the GB bits to transmit information may save spectrum resources; however, DL transmissions may interfere with each other, due to the lack of separation in the frequency domain. Accordingly, aspects of the present disclosure further provide techniques for adjusting an interference level by a transmitter and receiver techniques for processing the received signals.

As described herein, a wireless device may transmit using frequency tones located within a guard band. Advantageously, the wireless device may control the transmit power of at least one tone transmitted in the guard band. Controlling transmission of the at least one tone may reduce interference at a receiving device. A wireless device may control the transmit power by reducing the transmit power on a certain tone or certain tones of the transmission in the guard band.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer-readable medium for execution on a processor or computer. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals (SSs). However, in some cases DCells may transmit SSs. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive a measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. According to aspects, the wireless network 100 may be a heterogeneous numerology system, wherein UEs 120 within the network 100 may be asynchronous and have one or more of a different subcarrier spacing, different cyclic prefix (CP) length, different waveform length, and/or different synchronization in the time domain.

A transmitter 110a in a heterogeneous numerology wireless communication system may transmit a first signal using a first group of one or more tones, transmit a second signal using a second group of one or more tones, and transmit a third signal using a third group of one or more tones in a guard band between the first and second groups of tones. According to one example, transmitting the third signal includes controlling a transmit power of at least one tone of the third group of one or more tones in the guard band. The at least one tone of the third group of tones may be on a different frequency grid than the first group of one or more tones or the second group of one or more tones.

According to an example, the third signal transmitted in the GB includes repetitions of a same symbol. In this manner, the receiver (e.g., UE 120*a*) may decode signal transmitted in the GB, subtract the estimate GB signal from a desired signal (e.g., the first signal), and decode the desired signal with reduced interference from the signal transmitted in the GB. The transmitter 110*a* may comprise and/or include a transmission reception point (TRP).

A UE 120*a*, also operating in the heterogeneous numerology wireless communication system, may receive a first signal using a first group of one or more tones and may receive a third signal using a third group of one or more tones. The third group of tones may be in a GB, which is between the first group of one or more tones and a second group of one or more tones used for transmitting, from a BS, a second signal. According to aspects, the UE may or may not receive the second signal.

According to an example, a third UE may receive information regarding a first signal transmitted by a first UE on a first group of one or more tones, receive information regarding a second signal transmitted by a second UE on a second group of one or more tones, and transmit, by the third UE, a third signal using a third group of one or more tones in a guard band between the first and second groups of tones. According to one example, transmitting the third signal includes controlling a transmit power of at least one tone of the third group of one or more tones in the guard band. According to one example, the at least one tone of the third group of tones is on a different frequency grid than the first group of one or more tones or the second group of one or more tones.

As describe above, in one example, the signal transmitted in the GB may be a repetition of a same symbol. In this manner, the receiving UE 120*a* may decode the signal transmitted in the GB, subtract the estimate GB signal from a desired signal (e.g., the first signal), and decode the desired signal with reduced interference from the signal transmitted in the GB.

According to aspects, the signal transmitted in the GB may not be a repetition of a same symbol. For example, the signal may be any waveform with good spectrum confinement (smoothness).

The BS 110 may be configured to perform the operations 900, 3200, 3400, and other operations and techniques described herein related to, but not limited to, transmission and reception of signal in a guard band and/or transmission or reception in a wireless communication environment supporting heterogeneous numerologies. The UE (e.g., UE 120*a*) may be configured to perform the operations 1000, 3300, 3500, and other operations and techniques described herein related to, but not limited to, transmission and reception of signal in a guard band and/or transmission or reception in a wireless communication environment supporting heterogeneous numerologies.

As an example, the BS 110*a* and the UE 120*a* may be configured to perform other aspects described for transmitting using bits of a GB and processing desired signals with reduced interference, which are described in more detail herein.

According to aspects, the BS 110*a* and the UE 120*a* may each include a communication manager module 140 and 150, respectively. The communication manager 140, 150 may assist in controlling the transmit power of at least one tone in the guard band and other aspects described herein. The communication manager may be a separate entity or may be incorporated within any one or more modules illustrated, for example in FIGS. 4, 36, and 37. As an example, the communication manager may be part of the controller/processor 440, 480, processors 3620, 3720, and/or the transceiver 432, 454, 3610, 3712.

The system illustrated in FIG. 1 may be, for example, a long term evolution (LTE) network. The wireless network 100 may include a number of Node Bs (e.g., eNodeBs, eNBs, 5G Node B, etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of an Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110*a*, 110*b* and 110*c* may be macro Node Bs for the macro cells 102*a*, 102*b* and 102*c*, respectively. The Node B 110*x* may be a pico Node B for a pico cell 102*x*. The Node Bs 110*y* and 110*z* may be femto Node Bs for the femto cells 102*y* and 102*z*, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110*r* may communicate with the Node B 110*a* and a UE 120*r* in order to facilitate communication between the Node B 110*a* and the UE 120*r*. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Figure 2:
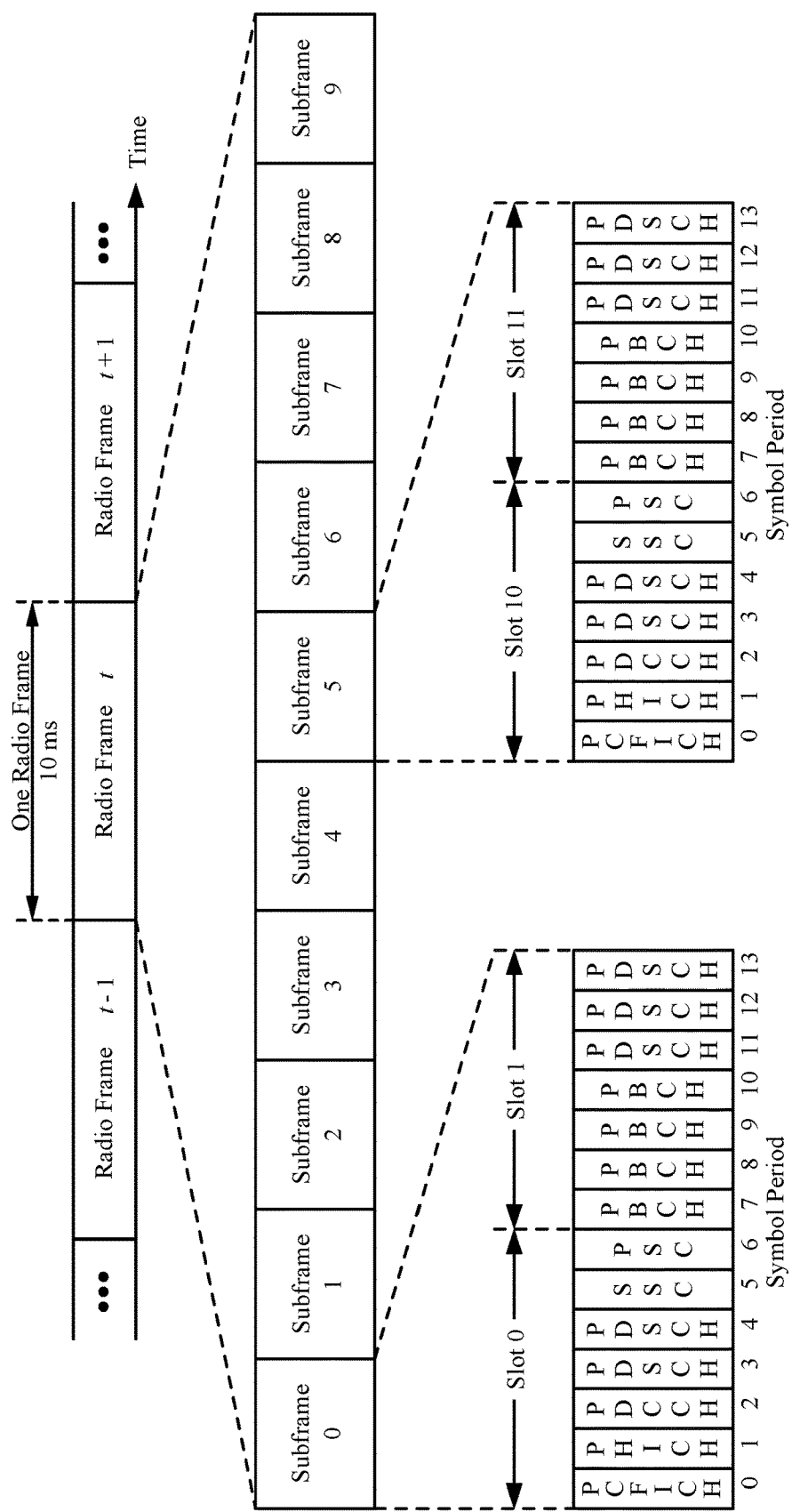
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks (RBs). Each RB may cover N subcarriers (e.g., 12 subcarriers) in one slot (e.g., 0.5 ms).

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

Figure 3:
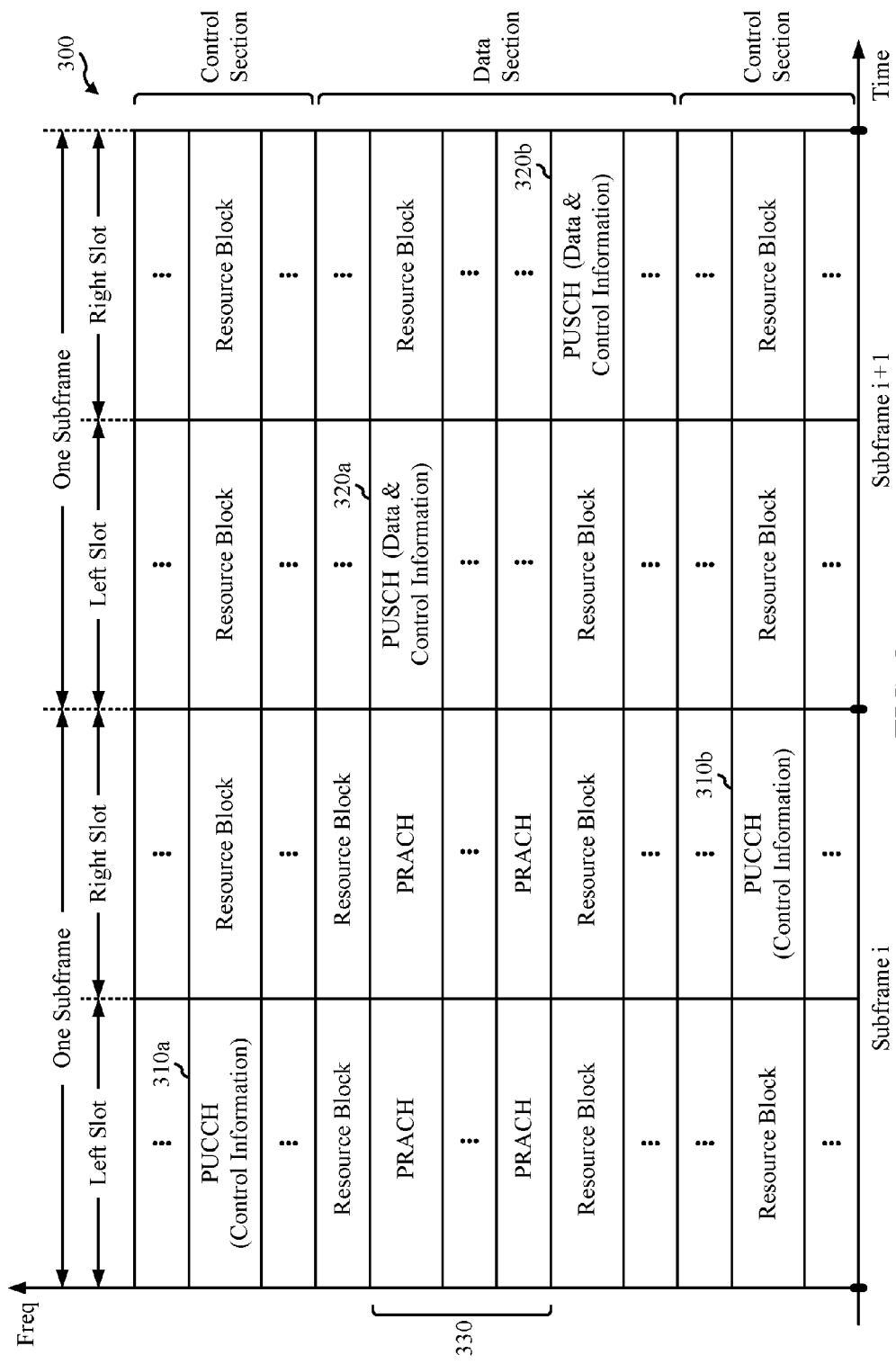
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
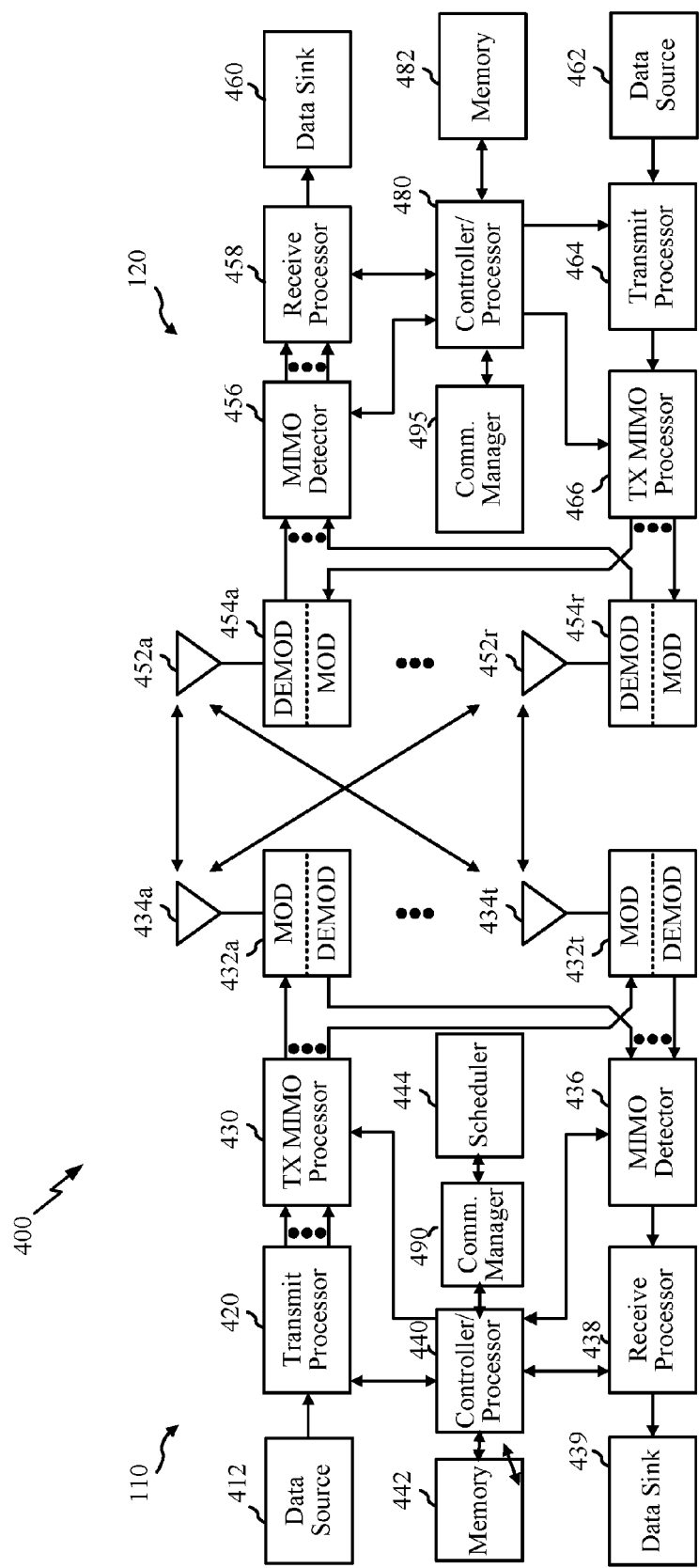
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 9-37. The BS 110 may comprise a TRP. As illustrated, the BS/TRP 110 and UE 120 may communicate during one or more portions of a flexible guard band.

As described above, the BS and the UE may include a communication manager 490, 495, respectively. The communication manager may be configured to control a transmit power of at least one tone transmitted on a guard band. While the communication manager is illustrated as a separate entity in FIG. 4, according to certain aspects, the communication manager may be incorporated in one or more other modules at the BS and UE. As an example, the communication module may be part of the controller/processor and/or the transceiver.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings.

Figure 9:
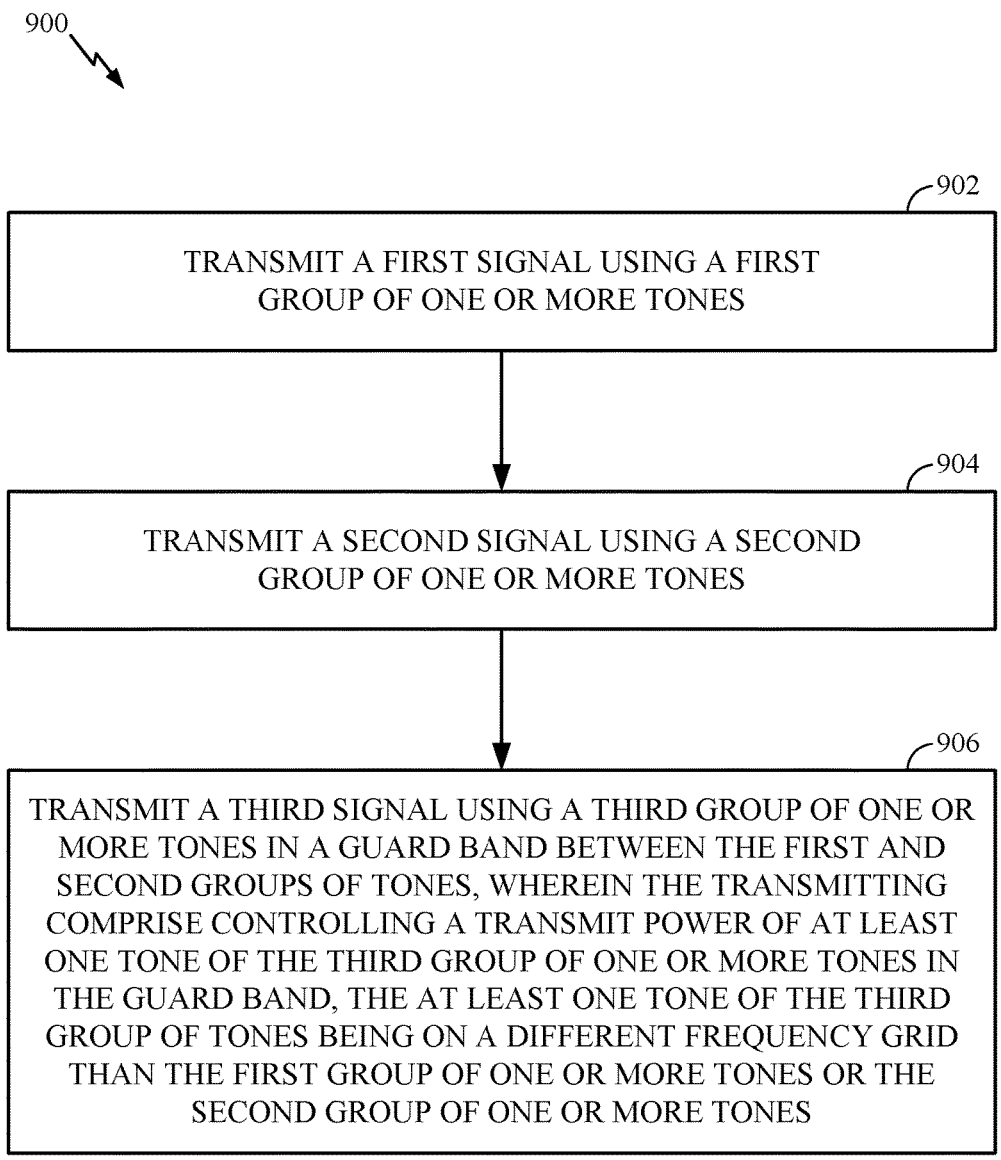
FIG. 9 illustrates example operations which may be performed by a BS, according to aspects of the present disclosure.
Figure 32:
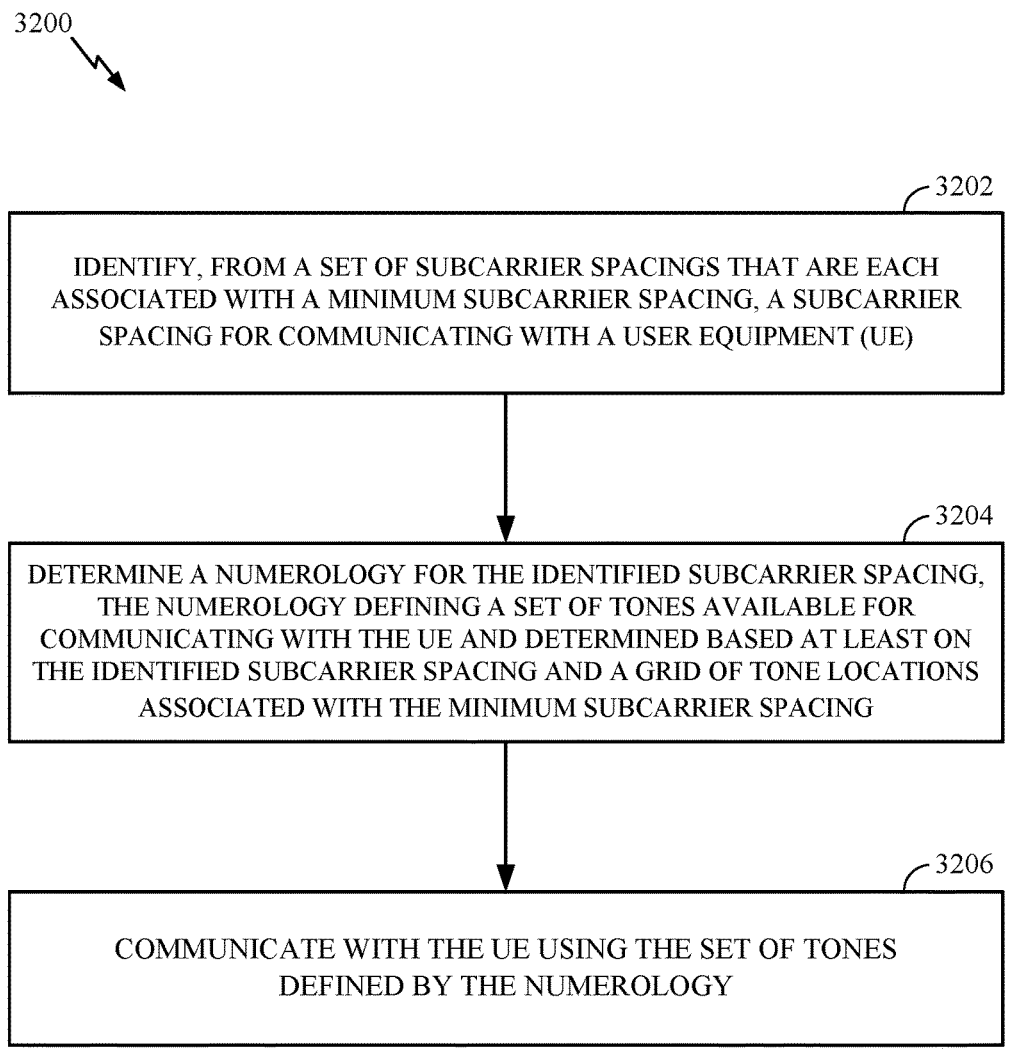
FIG. 32 is a flowchart illustrating example operations for wireless communications by a BS, according to aspects of the present disclosure.
Figure 33:
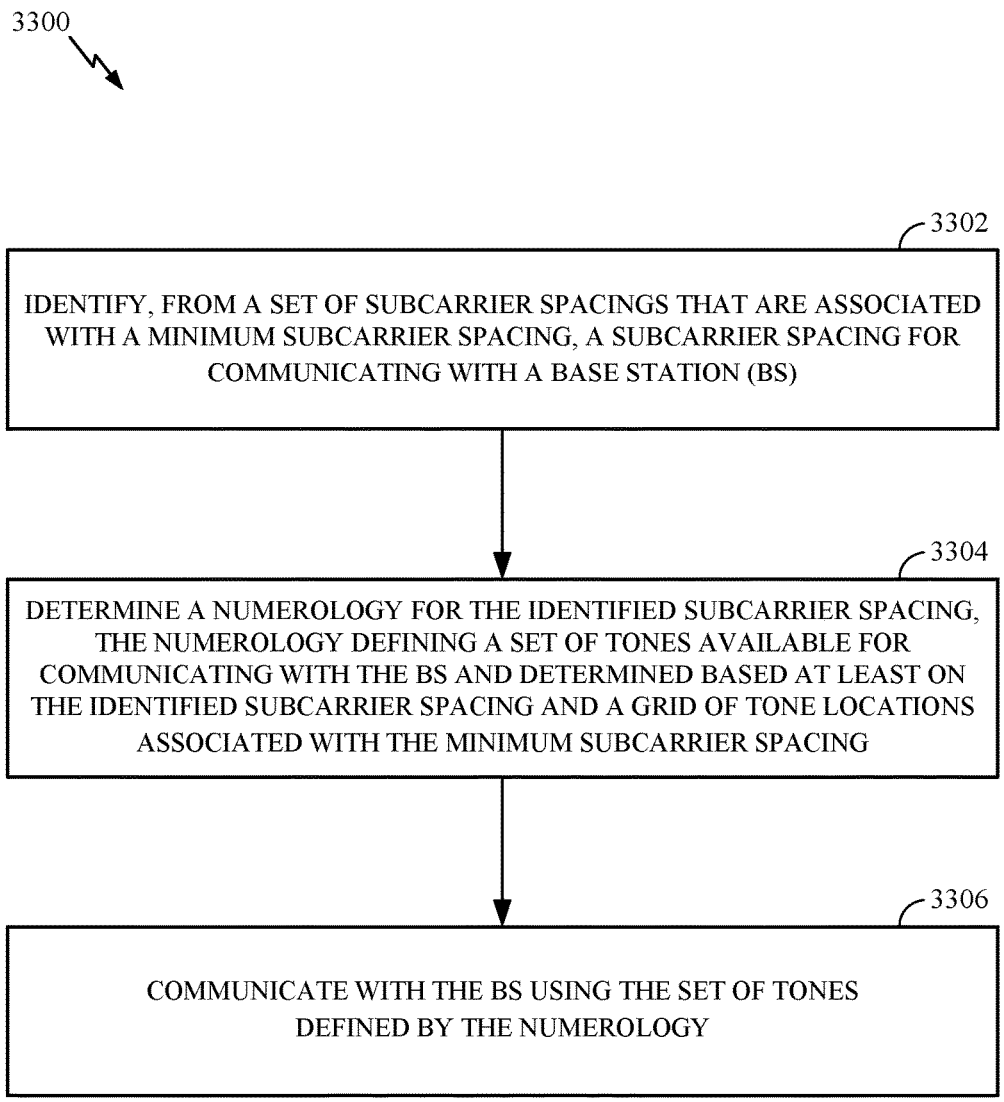
FIG. 33 is a flowchart illustrating example operations for wireless communications by a UE, according to aspects of the present disclosure.
Figure 34:
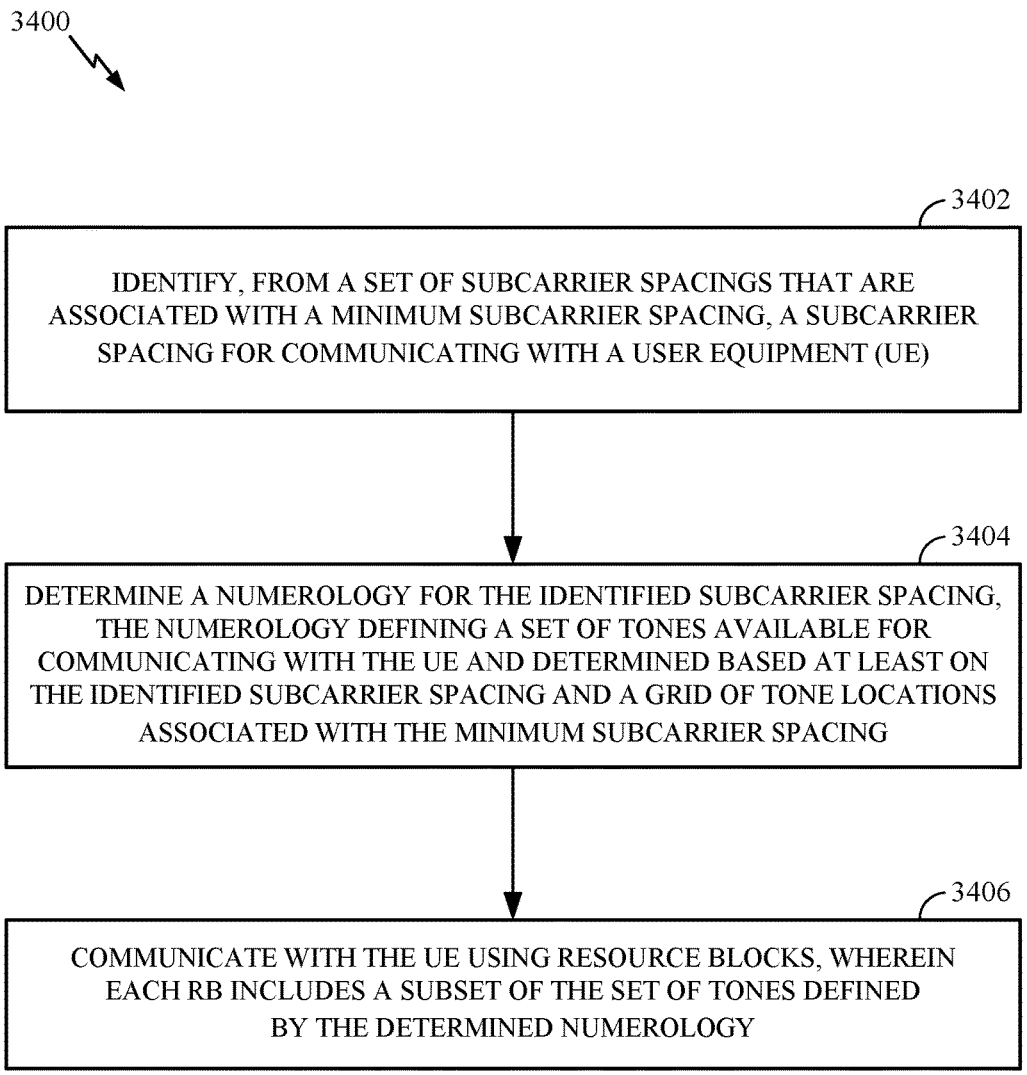
FIG. 34 is a flowchart illustrating example operations for wireless communications by a BS, according to aspects of the present disclosure.

The processors and/or modules at the base station 110 may direct the operations of the functional blocks illustrated in FIGS. 9, 32, and 34 and/or other processes for the techniques described herein. The processors and/or modules at the UE 120 may direct the operations of the functional blocks illustrated in FIGS. 10, 33, 35, and/or other processes for the techniques described herein. A scheduler 444 may schedule UEs for data transmission on the downlink and/or uplink.

Figure 5:
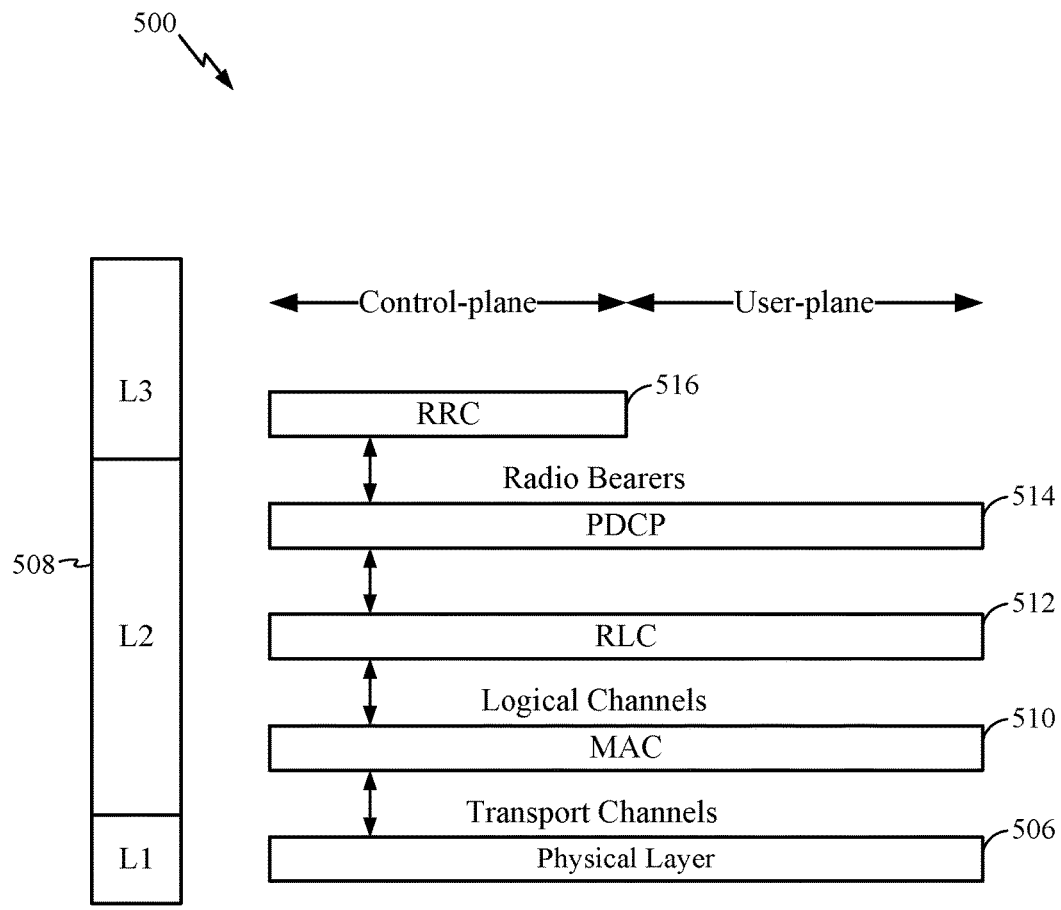
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
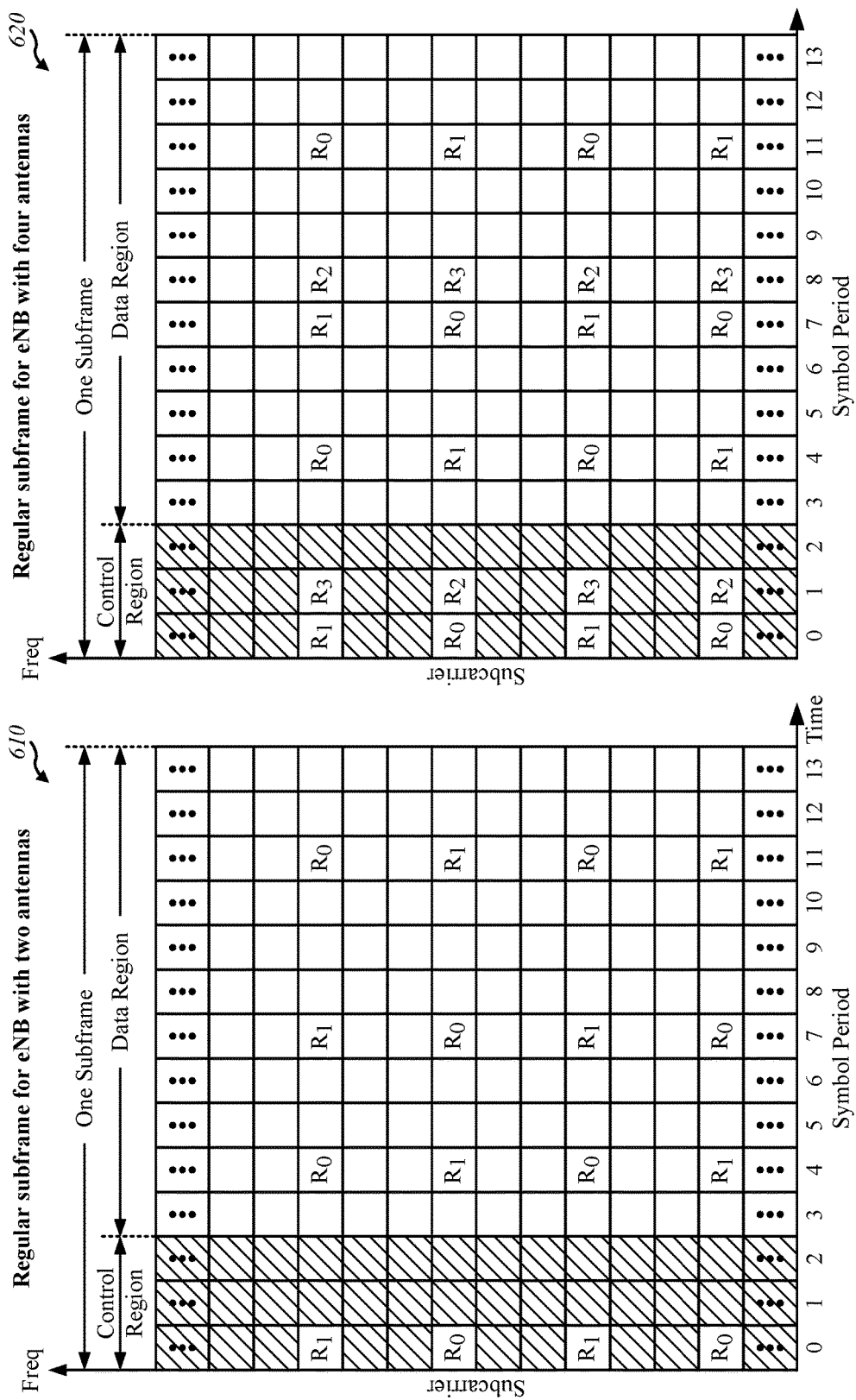
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into RBs. Each RB may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

Example New Radio Cell Measurement

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmWave) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access Node Controller (ANC). The CU terminates backhaul interface to RAN-CN, terminates backhaul interface to neighbor RAN node. The RAN may include a distributed unit that may be one or more TRPs that may be connected to one or more ANCs. TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Example Use of Flexible GB for Heterogeneous Neurology Systems

Heterogeneous numerology wireless communication systems may refer to systems in which UEs may be asynchronous. For example, signals transmitted in the wireless communication systems may have a different subcarrier spacing, different CP length, different waveform length, and/or different synchronization in the time domain.

Figure 7:
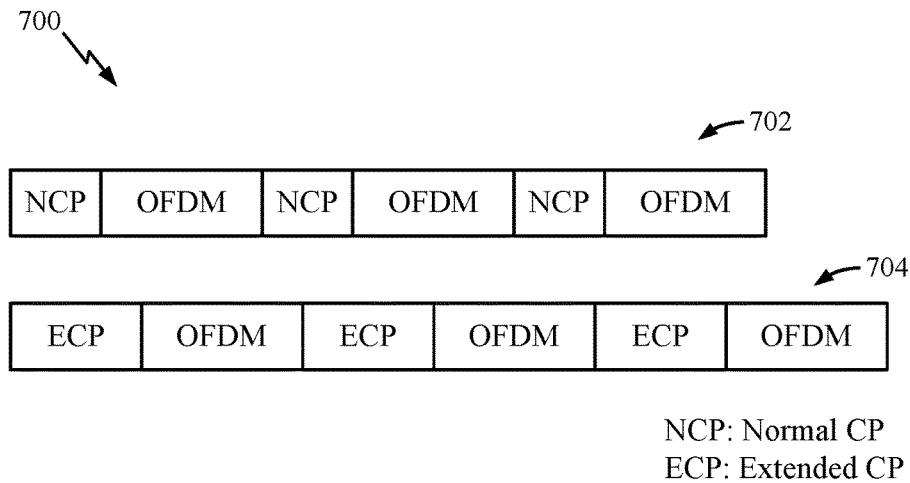
FIG. 7 illustrates an example of two waveforms, each having a different symbol length.

FIG. 7 illustrates an example of two signals (e.g., waveforms) 700, each signal having a different symbol length. 702 illustrates an example signal including OFDM symbols having a normal CP (NCP). 704 illustrates an example signal including OFDM symbols having an extended CP (ECP). As illustrated, the ECP of the signal 704 is longer in the time domain as compared to the NCP of the signal 702.

In new radio (NR) technologies, the CP lengths may be different as illustrated in FIG. 7. Accordingly, the OFDM symbol boundary of a first signal 702 may not align with the OFDM symbol boundary of a second signal 704; however the waveforms may be aligned, for example, at a slot or subframe level. Due to the lack of alignment, signals 702 and 704 may cause interference with each other. A GB may be used, in an effort to separate signals which cause interference with each other. As an example, the GB may control inter-carrier interference (ICI) between the waveforms.

Figure 8:
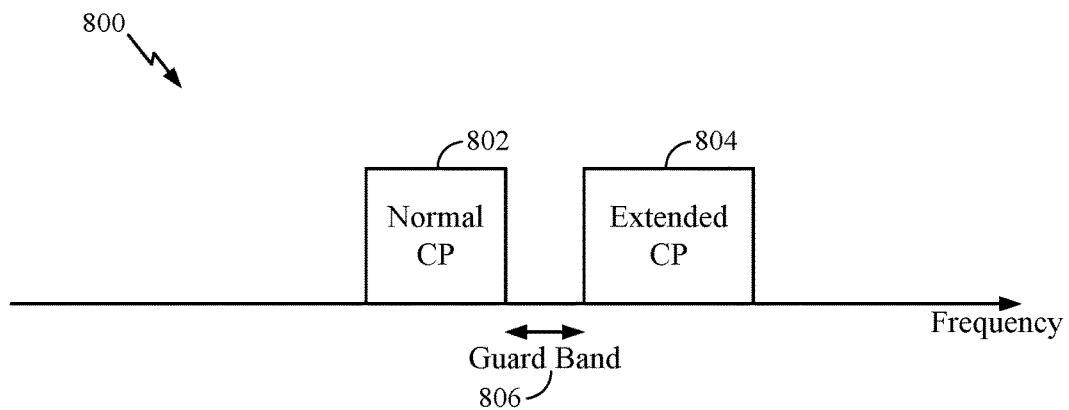
FIG. 8 illustrates an example of a GB used to separate a first and second signal.

FIG. 8 illustrates an example GB 800 used to separate a first and second signal. Signals 802 and 804 may correspond to signals 702 and 704, respectively. In an effort to separate signals which may cause interference to one another, a GB 806 in the time domain may be introduced between the first signal 802 and the second signal 804. In conventional systems the GB 806 may refer to a "quiet time" or an "unoccupied bandwidth" inserted between signals in an effort to ensure the signals do not interfere with each other. According to aspects of the present disclosure, the one or more tones of the GB may be used to advantageously transmit information in an effort to utilize spectrum resources. The information may include control and/or data.

FIG. 9 illustrates example operations 900 which may be performed by a transmitter such as a BS, according to aspects of the present disclosure. The BS may be BS 110a of FIG. 1 and may include one or more components illustrated in FIG. 4. According to aspects, the BS may be the BS illustrated in FIG. 37, including one or more components configured to perform the operations described herein.

At 902, the BS may transmit a first signal using a first group of one or more tones. At 904, the BS may transmit a second signal using a second group of one or more tones. At 906, the transmitter may transmit a third signal using a third group of one or more tones in a guard band between the first and second groups of tones. Transmitting the third signal may include controlling a transmit power of at least one tone of the third group of one or more tones in the guard band, the at least one tone of the third group of tones being on a different frequency grid than the first group of one or more tones or the second group of one or more tones.

As will be described in more detail herein, in an effort to facilitate interference handling by a UE, the third signal may, advantageously comprise one or more repetitions of a first symbol. According to certain aspects, the third signal is not limited to a perfect sinusoid signal with repetition. The third signal may be any signal, including special signals, such as synchronization signals that may be used for timing estimation by a receiver, and/or a reference signal that may be used for channel estimation. In some cases, the third signal may be any waveform with good spectrum confinement (smoothness), such as cyclic prefix-frequency-shift keying (CPFSK) based, minimum shift keying (MSK) based, and pi/2*(binary phase-shift keying) based signals.

According to aspects, transmitting the third signal may include varying a modulation and coding scheme (MCS) for at least the one tone of the third group of one or more tones in the guard band based. The MCS may be varied based, at least in part, on a frequency proximity to at least one of the first or second group of tones. Varying the MCS is described in more detail with respect to FIG. 15.

As will be described in more detail below, the BS may determine one or more tones on which to transmit the first signal, the second signal, and the third signal by identifying, from a set of subcarrier spacings that are associated with a minimum subcarrier spacing, a subcarrier spacing for communicating with a UE. The BS may determine a numerology for the identified subcarrier spacing. The numerology may define a set of tones available for communicating with the UE and may be determined based at least on the identified subcarrier spacing and a grid of tone locations associated with the minimum subcarrier spacing. The BS may transmit an indication of the determined numerology to the UE. Using the indicated numerology, the UE may receive signals (any one or more of the first, second, or third signals) transmitted by the BS.

As will be described in more detail below, the BS may determine one or more RBs to use to transmit the first signal, the second signal, and the third signal. The first group of one or more tones is transmitted to a first UE using a first group of RBs having a first subcarrier spacing and the second group of one or more tones is transmitted to a second UE using a second group of RBs having a second subcarrier spacing. Each of the first and second group of RBs may include a subset of tones determined based at least on a respective identified subcarrier spacing and a grid of tone locations associated with a minimum subcarrier spacing associated with the first or second UE.

Figure 10:
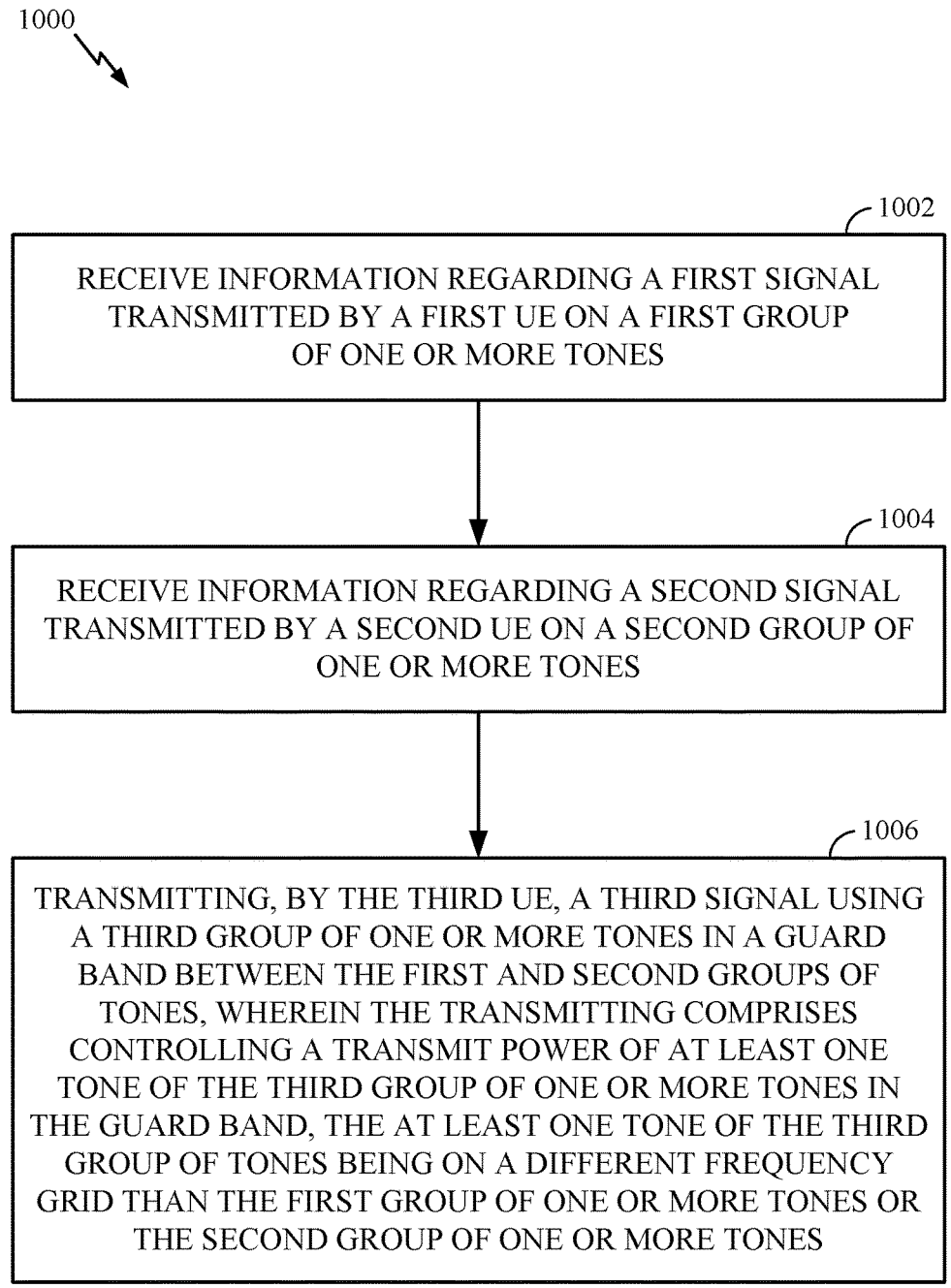
FIG. 10 illustrates example operations which may be performed by a UE, according to aspects of the present disclosure.

FIG. 10 illustrates example operations 1000 which may be performed by a third UE according to aspects of the present disclosure. The third UE may be UE 120a of FIG. 1 and may include one or more components illustrated in FIG. 4. According to aspects, the third UE may be the UE illustrated in FIG. 36, including one or more components configured to perform the operations described herein.

At 1002, the third UE may receive information regarding a first signal transmitted by a first UE on a first group of one or more tones. At 1004, the third UE may receive information regarding a second signal transmitted by a second UE on a second group of one or more tones. At 1006, the third UE may transmit a third signal using a third group of one or more tones in a guard band between the first and second groups of tones. Transmitting the third signal may include controlling a transmit power of at least one tone of the third group of one or more tones in the guard band, the at least one tone of the third group of tones being on a different frequency grid than the first group of one or more tones or the second group of one or more tones.

According to one example, the first group of one or more tones has a first subcarrier spacing, and the second group of one or more tones has a second subcarrier spacing. If the first subcarrier spacing is a multiple of the second subcarrier spacing, the third UE may control the transmit power by reducing the transmit power of the at least one tone which is not on a frequency grid of the first group of one or more tones. This will be described in more detail with reference to, for example, FIG. 17.

According to an example, the first subcarrier spacing may be twice as large as the second subcarrier spacing. The third UE may control the transmit power by reducing the transmit power on every other tone of the third signal.

According to aspects, transmitting the third signal may include varying a MCS for at least the one tone of the third group of one or more tones in the guard band based, at least in part, on a frequency proximity to at least one of the first or second group of tones. Transmitting the third signal may include synchronizing one or more tones in the third group of tones in the guard band with at least one of the first group of tones or the second group of tones, wherein the synchronizing comprises matching at least one of symbol length, cyclic prefix length, symbol boundary, subframe boundary, or subcarrier spacing of the third group of tones with one of the first or second group of tones.

According to aspects, controlling the transmit power includes reducing the transmit power of the tones in the guard band which are adjacent to at least one of the first or second groups of tones.

Generally, the aspects described herein for transmitting a signal during a GB may be performed by either a BS or a UE.

Figure 11:
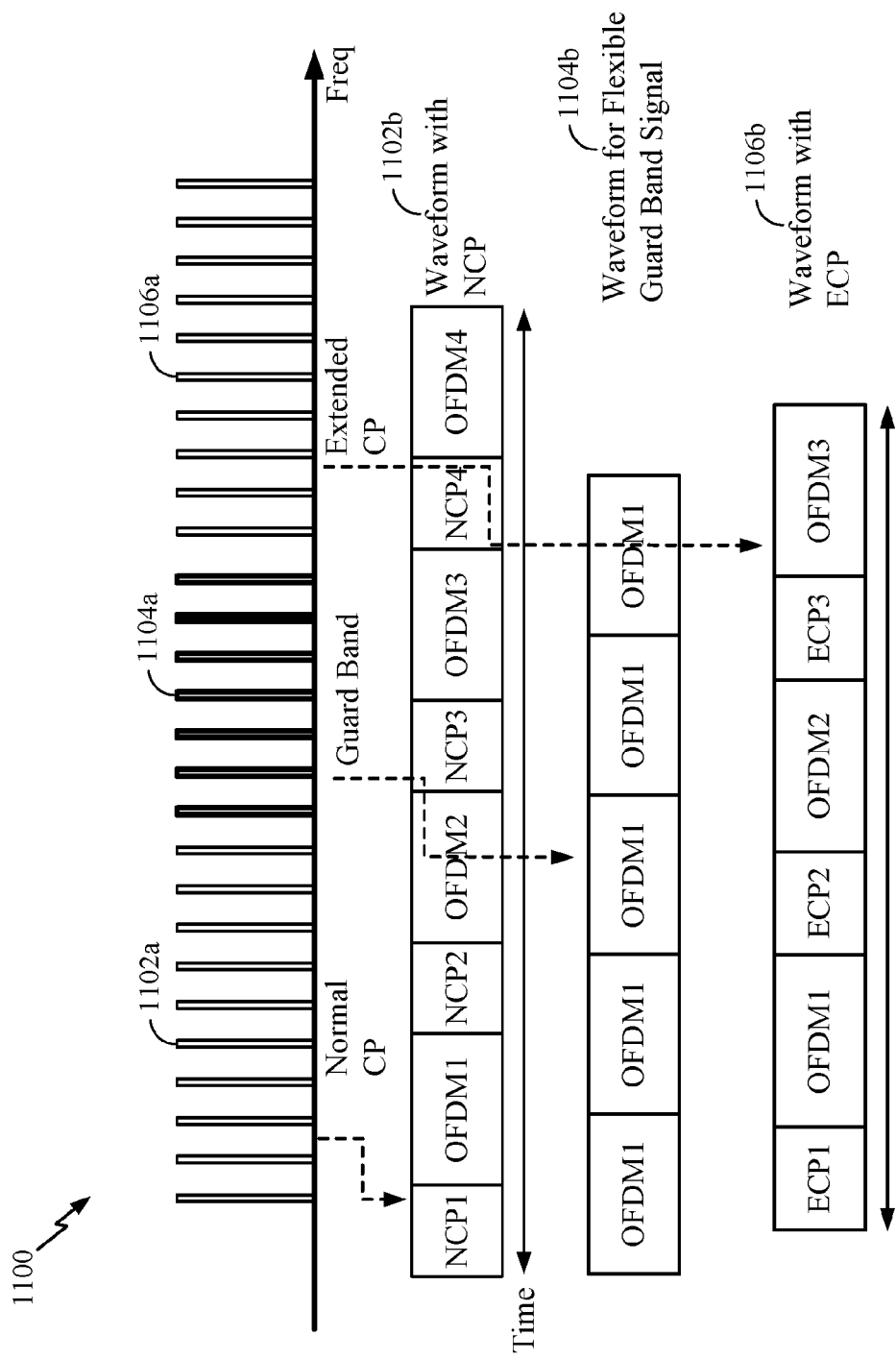
FIG. 11 illustrates an example of transmission using a GB, according to aspects of the present disclosure.

FIG. 11 illustrates an example 1100 of transmission using a GB, according to aspects of the present disclosure. 1102a, 1104a, and 1106a are illustrated with frequency on the x-axis. 1102a may correspond to signal 702 and 802 from FIGS. 7 and 8 and signal 1106a may correspond to signals 704 and 804 from FIGS. 7 and 8. Signal 1102a may be a waveform including NCPs and signal 1106a may be a waveform including ECPs. Accordingly, in certain scenarios, signals 1102a and 1106a may cause interference to each other. Instead of inserting a conventional GB where no information is transmitted, aspects of the present disclosure may use the GB 1104a to transmit information. The information may be transmitted such that it causes minimal to no interference to a receiver receiving one or both of the first 1102a and second 1106a signals.

1102b, 1104b, and 1106b illustrate the transmissions 1102a, 1104a, and 1106a with time on the x-axis. The transmitter may advantageously repeat a same OFDM symbol during the GB 1104a, 1104b. While 1104b illustrates repeating "OFDM1," the transmitter may repeat any symbol, such as "OFDM X" during the GB 1104b. By repeating a same symbol, a receiver may decode a GB, reconstruct the estimated GB, and decode a desired signal (e.g., 1102a/b, 1106a/b) with reduced to no interference from the GB transmission.

Figure 12:
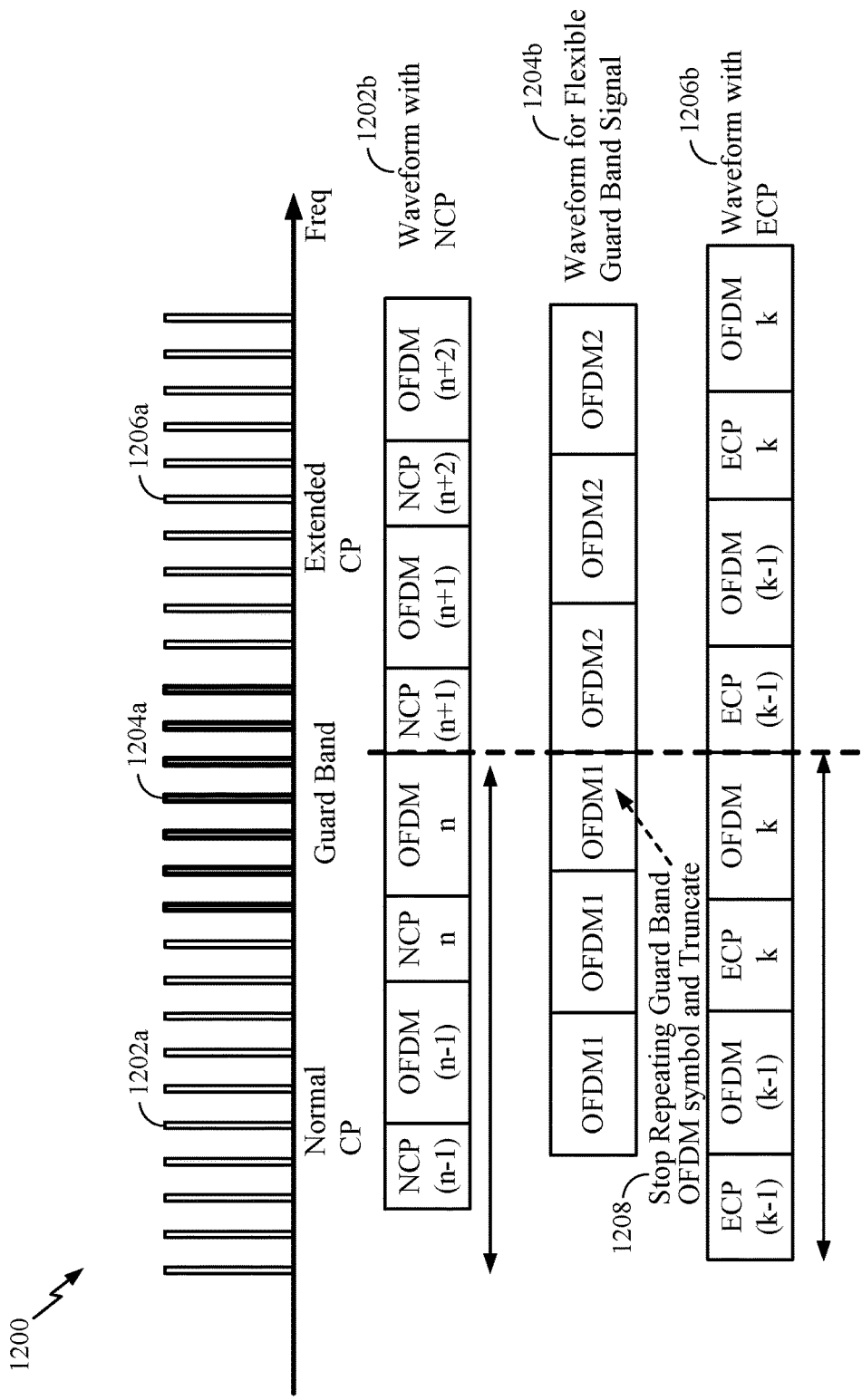
FIG. 12 illustrates an example of transmission using a GB, according to aspects of the present disclosure.

FIG. 12 illustrates an example 1200 of transmission using a GB, according to aspects of the present disclosure. Similar to the description of FIG. 11, a transmitter may transmit a first signal 1202a and a second signal 1206a. The transmitter may transmit information on the GB 1204a on frequency tones between the first 1202a and second 1206a signals. As illustrated in FIG. 11, the transmitter may repeat the same symbol during the GB. According to aspects, the GB may repeat the same symbol "OFDM1" until the end of a subframe. At the beginning of a next subframe, the transmitter may begin to repeatedly transmit a second, different symbol "OFDM2." In other words, the transmitter may transmit a different GB signal for each subframe. "OFDM1" and "OFDM2" are example symbols. The transmitter may repeat any symbol, such as "OFDM X" during the GB until the end of a subframe and may then repeatedly transmit a different symbol, such as "OFDM Y."

According to aspects, the transmitter may repeat a first symbol, such as "OFDM1" or "OFDM X" until the symbol boundary of the two waveforms 1202a and 1206a align in the time domain, or almost align in the time domain. After alignment, the transmitter may stop repeating the first symbol and may begin to repeatedly transmit a second symbol, such as "OFDM2" or "OFDM Y."

1208 illustrates an example symbol alignment in the time domain of signals 1202b and 1206b. As shown at 1204b the transmitter may repeatedly transmit a first OFDM symbol. At 1208, when a symbol boundary of the first signal 1202b aligns with a symbol boundary of the second signal 1206b, the transmitter may stop repeating the first OFDM symbol in the GB 1204b and may begin repeatedly transmitting a second symbol in the GB.

Figure 13:
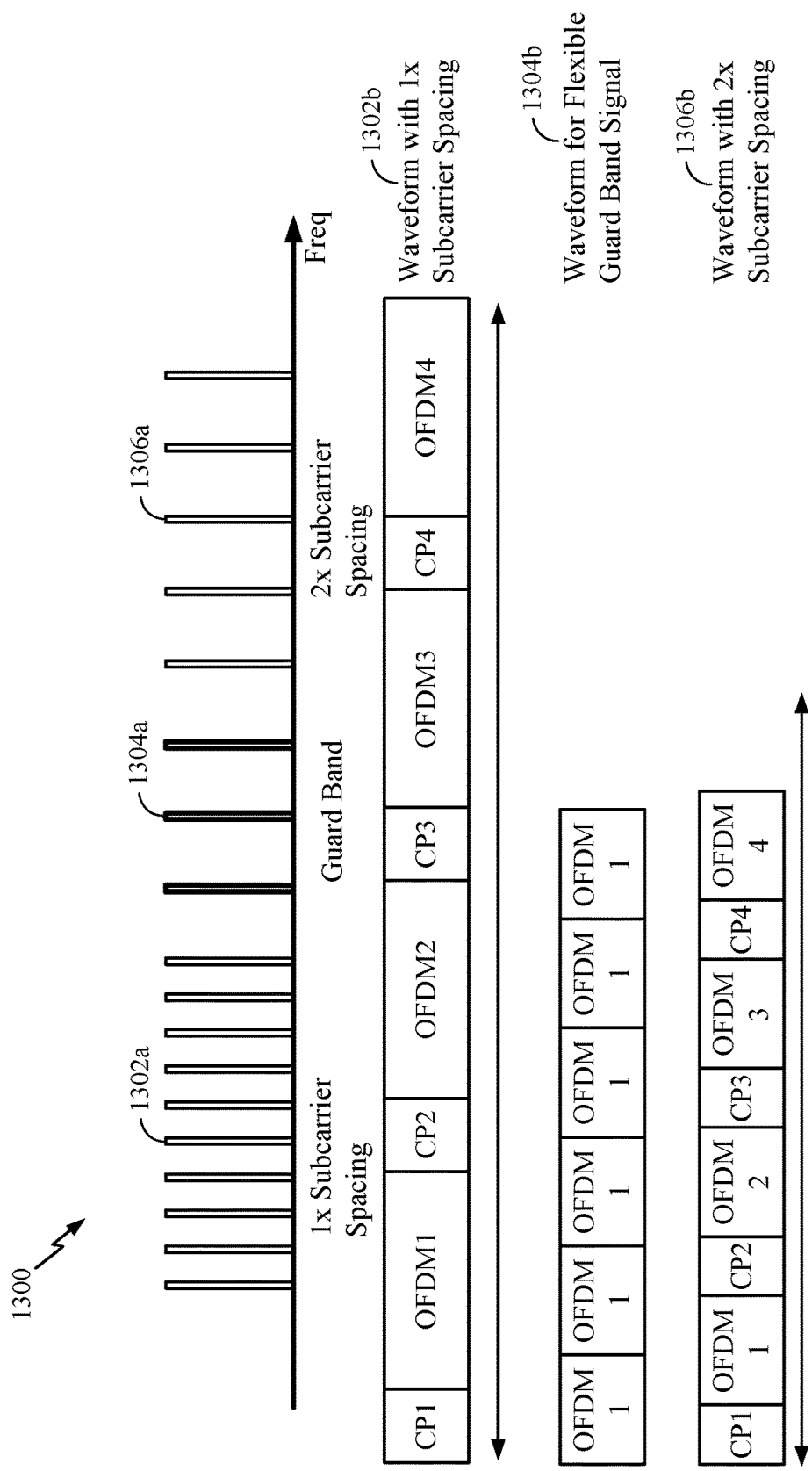
FIG. 13 illustrates an example of transmission using a GB, according to aspects of the present disclosure.

FIG. 13 illustrates an example 1300 of transmission using a GB, according to aspects of the present disclosure. At 1302a, a first signal may be transmitted with a 1x subcarrier spacing and at 1306a, a second signal may be transmitted with a 2x subcarrier spacing. Accordingly, the subcarrier spacing of 1306a is a multiple of the subcarrier spacing of 1302a.

Between the first 1302*a* and second signal 1306*a*, a GB 1304*a* may be used to transmit information. According to an example, as shown in the time domain, the first signal 1302*b* and the second signal 1306*b* may having a same CP length. According to aspects, the information transmitted in the GB may be transmitted using the 2x subcarrier spacing (e.g., using the larger subcarrier spacing). Accordingly, as shown at 1304*b*, the repeated OFDM symbols transmitted in the GB have a similar subcarrier spacing as the second signal 1306*b*, which is larger than the subcarrier spacing of the first signal 1302*a*. While not illustrated in FIG. 13, according to aspects, the information transmitted in the GB may be transmitted using the 1x subcarrier spacing (e.g., using the smaller subcarrier spacing).

More generally, with reference to FIG. 13, the first signal 1302*a* may be transmitted with a first subcarrier spacing that is different than a second subcarrier spacing associated with the second signal 1306*a*. The GB may be transmitted using a subcarrier spacing that is on a same frequency grid as the first and second subcarrier spacings (e.g., same frequency grid as 1306*a* as opposed to 1302*a*). Because 1306*a* has subcarrier spacing that is a multiple of the subcarrier spacing of 1302*a*, transmitting a signal in the GB on a similar frequency grid as 1306*a* may reduce or not cause interference to either the first signal 1302*a/b* or second signal 1306*a/b*.

Adjusting Interference

Figure 14:
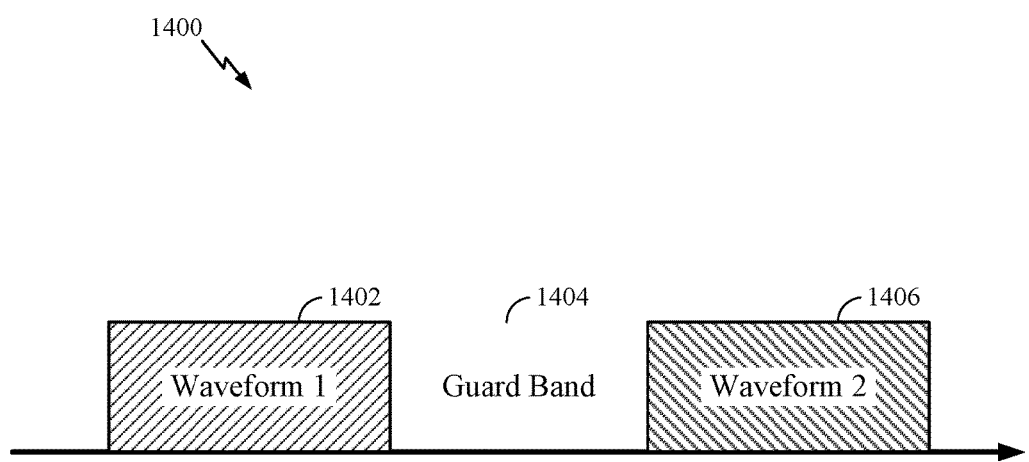
FIG. 14 illustrates an example of transmitting a first signal and a second signal with a GB between the first signal and the second signal.

FIG. 14 illustrates an example 1400 of transmitting a first signal and a second signal with a GB between the first signal and the second signal. As described above, the first signal 1402 and the second signal 1406 may interfere with each other when they are not separated by a GB 1404. Aspects described herein transmit a signal in the GB 1404, wherein the signal causes an acceptable level (e.g., minimal or no) interference to a receiver of the first and/or second signal. Stated otherwise, the transmitter may control transmission in the GB in an effort to reduce interference caused to an intended receiver of the first signal 1402 and/or the second signal 1406.

Figure 15:
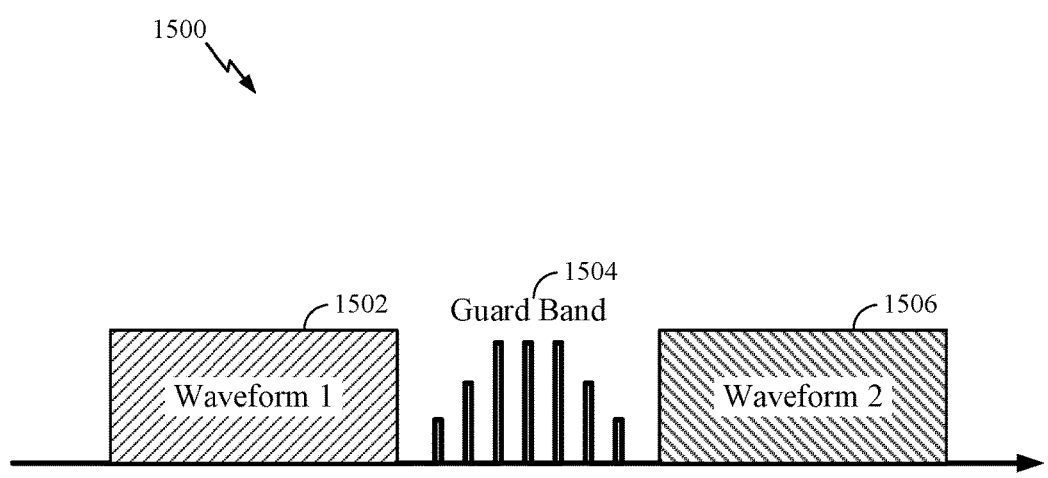
FIG. 15 illustrates an example of power control at a transmitter, in accordance with aspects of the present disclosure.

FIG. 15 illustrates an example 1500 of power control at a transmitter, in accordance with aspects of the present disclosure. The first signal 1502 and the second signal 1506 may have different subcarrier spacings (e.g., different OFDM symbol length and/or different CP length). According to aspects, a transmitter may assign a different power level to tones in the GB signal 1504. Tones within the GB 1504 close to a target signal (e.g., 1502 and/or 1506) may be transmitted with a lower transmit power as compared to tones within tones of the GB 1504 that are further away from the target signal. Thus, tones located further away from one or more target signals may have a higher transmit power than the tones closer to the one or more target signals. In this manner, the transmitter may assign varying power to tones in the GB 1504 in an effort to control (e.g., reduce) interference to the first signal 1502 and the second signal 1506.

As illustrated in FIG. 15, the tones in the middle of the GB 1504 are furthest away from the first signal 1502 and the second signal 1506 and may be transmitted at a higher power level than the tones of the GB located closer to the first signal 1502 and the second signal 1506. Additionally or alternatively, according to aspects, the transmitter may assign a different MCS to tones in the GB based, at least in part, on their proximity to the first signal 1502 and the second signal 1506. For example, the transmission power and/or MCS for one or more tones in the GB may vary based, at least in part, on a frequency proximity to the first signal 1502 and/or the second signal 1506. The transmitter may use a lower MCS for tones of the GB transmitted using a lower power level. Similarly, the transmitter may use a higher MCS for tones of the GB transmitted using a higher power level.

Figure 16:
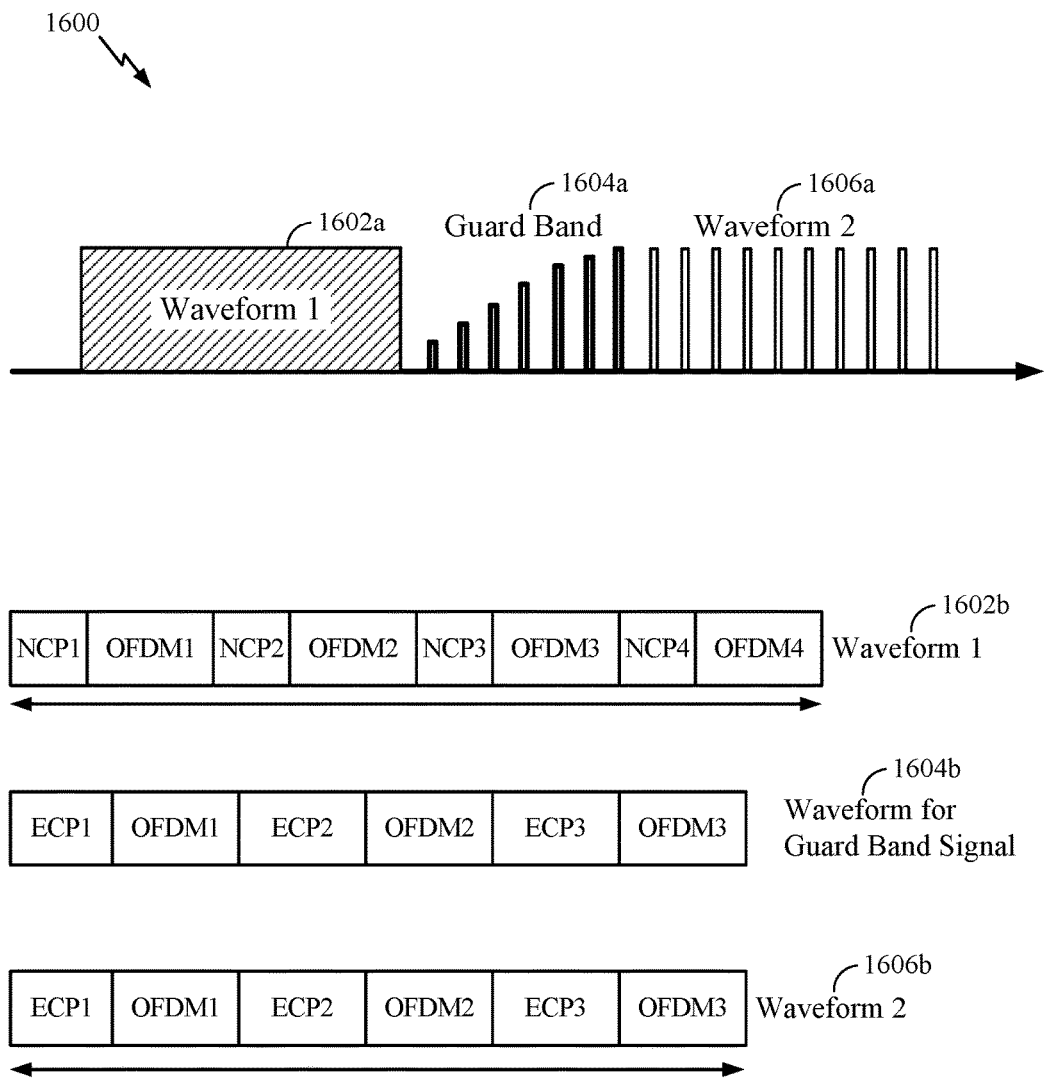
FIG. 16 illustrates an example for transmit power control, according to aspects of the present disclosure.

FIG. 16 illustrates an example 1600 for transmit power control, according to aspects of the present disclosure. According to aspects, the GB 1604*a*, 1604*b* may be synchronized with the second signal 1606*a*, 1606*b*. Synchronization may include matching at least one of symbol length, cyclic prefix length, symbol boundary, subframe boundary, or subcarrier spacing of the GB with either first or second signal. Accordingly, the GB may have a same numerology (same subcarrier spacing, CP length, waveform length, tone shift and/or and synchronization in the time domain) as the second signal. When the GB 1604*a*, 1604*b* has a same numerology as the second signal 1606*a*, 1606*b*, the GB 1604*a*, 1604*b* does not interfere with the second signal 1606*a*, 1606*b*.

The transmissions 1602*b* 1604*b*, and 1606*b* illustrate the time-domain transmission of the first signal 1602*a*, GB 1604*a*, and second signal 1606*a*, respectively. As illustrated and as described above, the GB signal 1604*b* is synchronized with the second signal 1606*b*. Accordingly, no power control may be necessary for tones of the GB 1604*a* close to the second signal 1606*a* in the frequency domain.

According to aspects, the first signal 1602*a* may have a different numerology than the GB 1604*a*. For example, as shown, 1602*b* and 1604*b* are not synchronized. Accordingly, power control of the GB 1604*a* transmission may be applied to tones of the GB close to the first signal 1602*a*. In this manner, a maximum or full transmit power may be used for transmissions close to the second signal 1606*a* and a reduced transmit power may be used as the tones in the GB a near the first signal 1602*a*.

Figure 17:
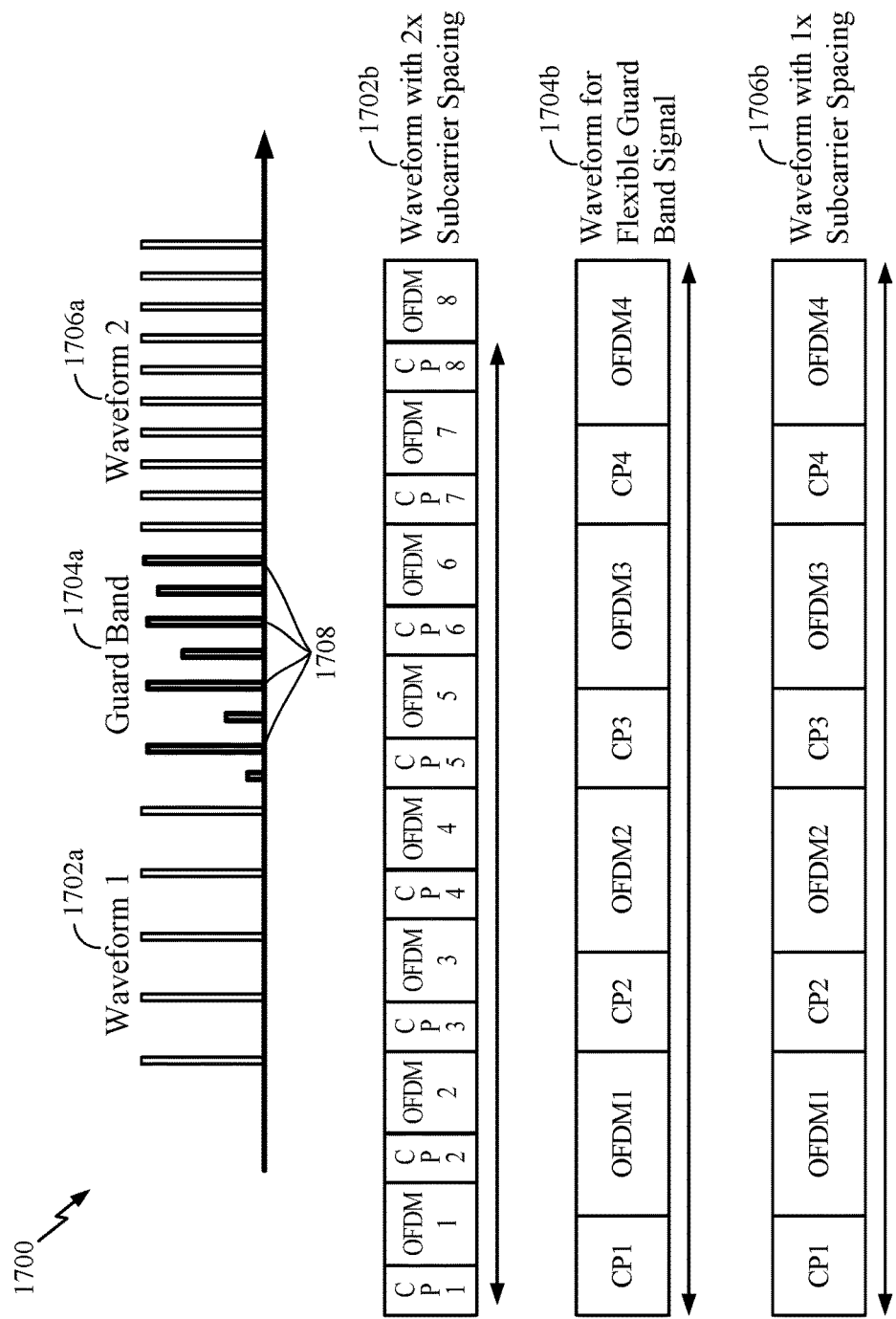
FIG. 17 illustrates an example for transmit power control, according to aspects of the present disclosure.

FIG. 17 illustrates an example 1700 for transmit power control, according to aspects of the present disclosure. As illustrated, the subcarrier spacing of the first signal 1702*a* is twice as large as the subcarrier spacing of the second signal 1706*a*. The CP length and OFDM symbol length of the first signal 1702*b* is half that of the CP length and OFDM symbol length of the second signal 1706*b*. Every other tone in the GB 1704*a* may not interfere with either the first signal 1702*a* or the second signal 1706*a*, because they arrive using the same resource grid as both the first and second signals. Further, because the GB 1704*b* is synchronized with the second signal 1706*b*, the GB may not interfere with the second signal.

Thus, full power may be used to transmit tones 1708 in the GB 1704*a*. Assuming the tones 1708 are associated with an even index, the odd indexed tones in the GB 1704*a* may interfere with the first signal 1702*a*. Accordingly, the transmit power may be reduced for the odd indexed tones which may interfere with the first signal 1702*a*. Thus, the transmit power of the tones in the GB may be reduced for tones that are not on a frequency grid as the first signal 1702*a*.

As illustrated at 1704*a*, the tones of the GB close to the first signal 1702*a* may be transmitted with a lower power as compared to the tones of the GB 1704*a* which are closer to the second signal 1706*a*.

With reference to FIG. 17, the subcarrier spacing of signal 1702*a* is a multiple of the subcarrier spacing of signal 1706*a*. The subcarrier spacing of signal 1702*a* may be larger than the subcarrier spacing of signal 1706*a*. According to one example, the signal in the GB is transmitted using the smaller subcarrier spacing (e.g., similar to spacing 1706*a*);

however, in an effort to avoid interference to signal 1702*a*, the transmit power for tones in the GB that are not on the frequency gird of 1702*a* (and are on the frequency grid of 1706*a*) is reduced. In this manner, the transmit power for at least one tone of the GB is varied when it is on a different frequency grid than at least one of the first or second signals.

Receiver Processing

Figure 18:
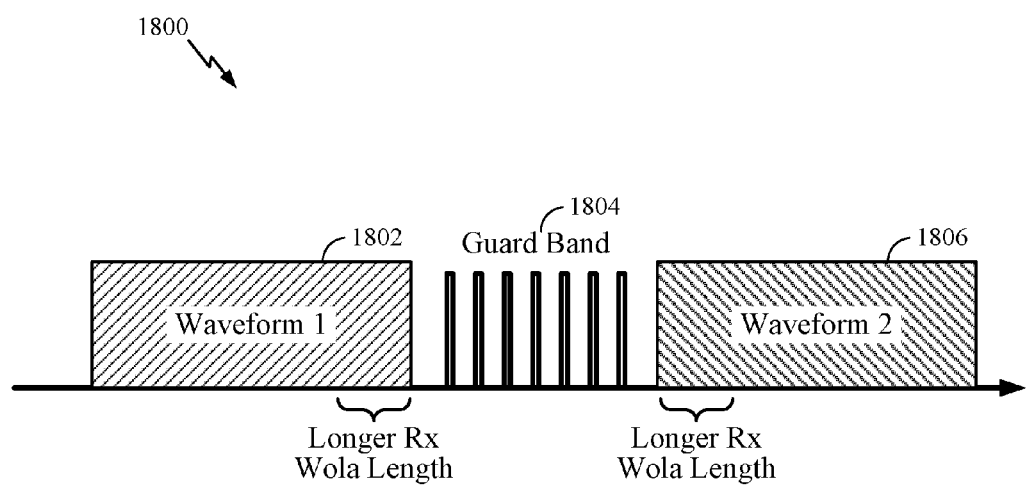
FIG. 18 illustrates an example of receiver processing, according to aspects of the present disclosure.

FIG. 18 illustrates an example 1800 of receiver processing, according to aspects of the present disclosure. A receiver (e.g., UE 120*a* in FIG. 1) may receive, at least a first signal 1802 and information transmitted on the GB 1804. According to aspects, the UE may receive both the first signal 1802, the second signal 1806, and the information transmitted on the GB 1804. In an effort to account for interference caused by transmissions on the GB 1804, the UE may use a different weighted overlap and add (WOLA) length for edged tones of a desired signal (e.g., 1802 and/Or 1806). For example, a UE receiving both the first signal 1802 and the GB 1804 may use a longer WOLA length for receiver processing on tones of the first signal close to the GB 1804. If the UE received the first signal 1802, the GB 1804, and the second signal 1806, the UE may use a longer WOLA on tones of the first signal close to the GB 1804 and on tones of the second signal 1806 close to the GB 1804, in an effort to reduce interference caused by the transmission on the GB 1804.

According to aspects, a receiver in a heterogeneous numerology wireless communication system may decode the GB signal 1804. The UE may reconstruct the estimated GB signal based, at least in part, on the decoded GB and the estimated channel (of the GB's transmission). The UE may subtract the estimated GB signal from a received signal, in an effort to decode one or both of the first signal and second signal 1802 and 1806.

To process the desired signals, receiving UEs may be aware of the existence of the GB 1804. According to aspects, a UE may be informed regarding whether a GB signal exists on each side of a desired signal. For example, using control information, a BS may inform a UE that an RB to the left of a desired signal either has or does not have a GB signal and/or that an RB to the right of a desired signal either has or does not have a GB signal. Each of the indications may be transmitted using 1-bit. With reference to FIG. 18, a BS may transmit a 1-bit indictor to indicate that a RB to the left of the first signal 1802 does not have a GB signal and may transmit a 1-bit indicator to indicate that a RB to the right of the first signal 1802 has a GB signal.

According to aspects, the presence, location and/or numerologies associated with GB may be broadcasted to UEs, for example, via a system information block (SIB).

According to aspects, certain channels may be channelized in the flexible guard band. These "special channels" may include an NB-IoT channel channelized next to a SYNC channel. According to aspects, the flexible guard band may include a SYNC channel. According to aspects, the flexible guard band may include reference signals. According to aspects, the flexible guard band may include a continuous sinusoid pilot signal which may be used for channel estimation.

Uplink Scenario

Figure 19:
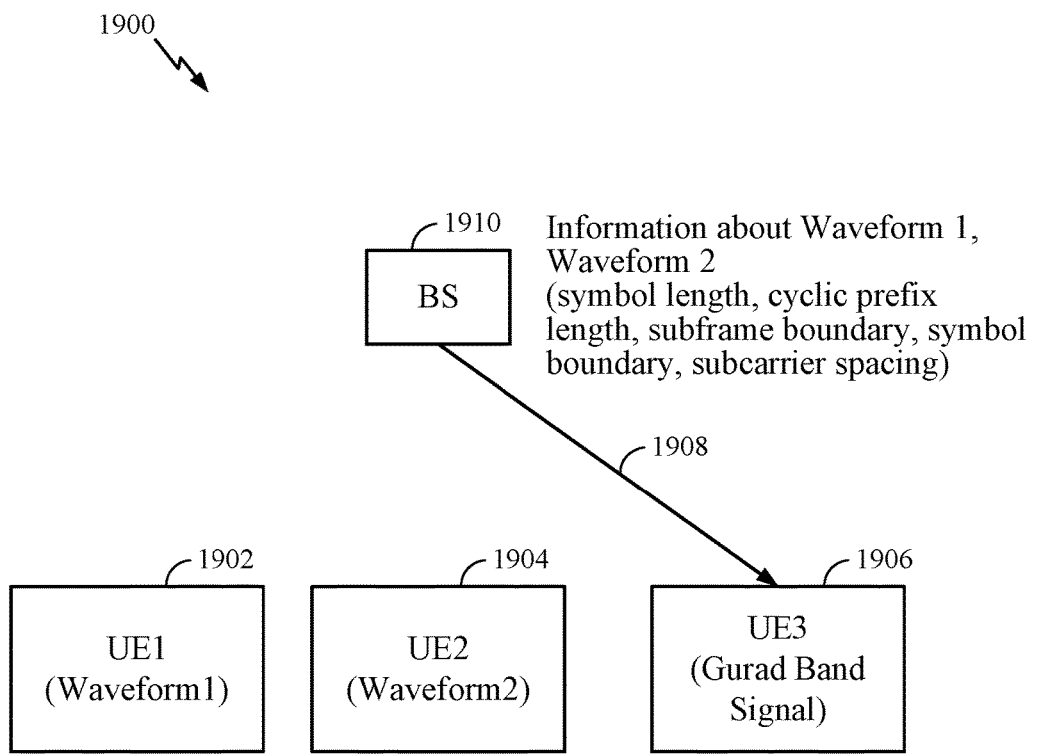
FIG. 19 illustrates an example of communication from a BS to a UE, according to aspects of the present disclosure.

FIG. 19 illustrates an example 1900 of communication from a BS to a UE, according to aspects of the present disclosure. According to aspects, a first UE 1902 may transmit signals using a first waveform, a second UE 1904 may transmit signals using a second waveform and a third UE 1906 may transmit signals using a third waveform. The third UE 1906 may be configured to transmit the third waveform using tones in a GB, for example, in accordance with operations 1000 in FIG. 10. The BS 1910 may transmit information 1908 regarding the first and second waveform to the third UE 1906. Example information that may be transmitted include symbol length, CP length, symbol boundary, subframe boundary, and subcarrier spacing of the first and/or second waveform.

Figure 20:
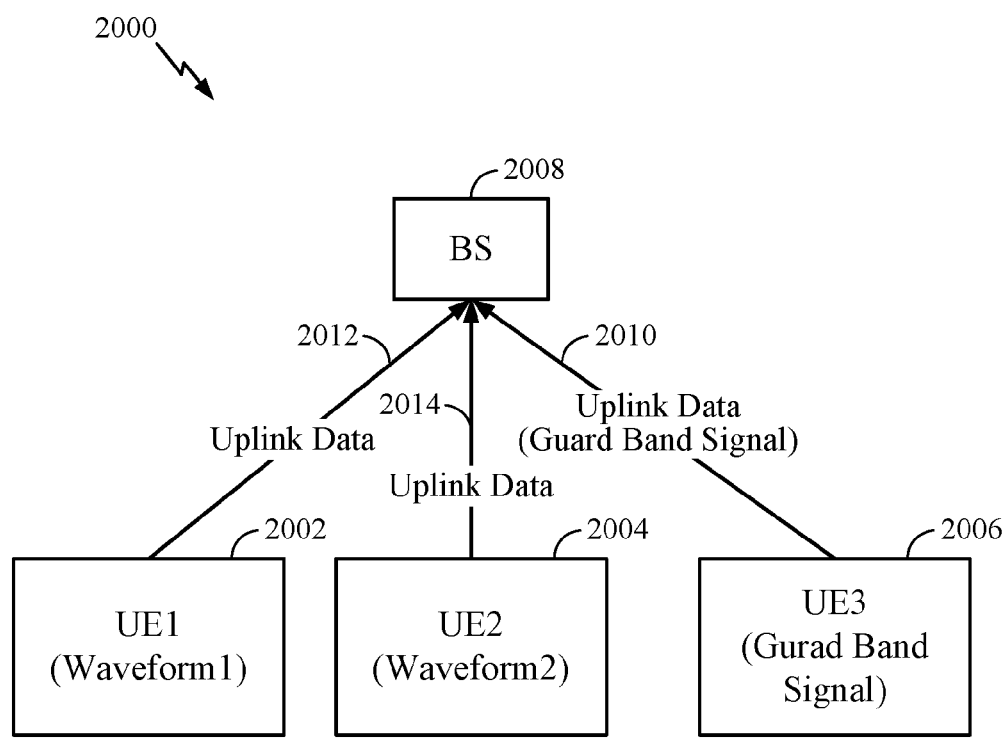
FIG. 20 illustrates an example of communication from UEs to a BS, according to aspects of the present disclosure.

FIG. 20 illustrates an example 2000 of communication between a BS and UEs, according to aspects of the present disclosure. After receiving information (e.g., 1908 from FIG. 19) regarding the first and/or second waveform, a third UE 2006 may transmit information using tones in the GB as shown at 2010. Accordingly, a first UE 2002 may transmit a first waveform 2012 to the BS 2008, a second UE 2004 may transmit a second waveform 2014 to the BS 2008, and the third UE 2006 may transmit a signal in the GB 2010 to the BS 2008.

Thus, according to certain aspects, a first UE may transmit a first signal using a first group of tones, a second UE may transmit a second signal using a second group of tones, and a third UE may transmit a third signal using a third group of tones in a guard band, wherein the guard band is between the first and second groups of tones.

Similarly, according to aspects, a UE 2006 may transmit a signal 2010 using one or more tones in a GB. For example, the UE 2006 may receive information regarding a first set of tones (e.g., 1908 in FIG. 19) which may be used by a first UE for UL transmission and may receive information regarding a second set of tones (e.g., 1908 in FIG. 19) which may be used by a second UE for UL transmission. Based, at least in part, on the received information, the UE may transmit a uplink information 2010 using tones in the GB (e.g., using tones between the first and second set of tones) to a BS.

Accordingly, the first UE 2002 may transmit a first signal 2012, the second UE 2004 may transmit a second signal 2014, and the third UE 2006 may transmit a third signal 2010. The third signal 2010 may be transmitted using tones between the tones used by the first UE 2002 and the tones used by the second UE 2004. In this manner, the BS may receive signals using tones in the GB.

Aspects described herein may advantageously be by transceivers in a heterogeneous numerology system, in an effort to transmit and receive information in a GB.

Example RB Management

Heterogeneous numerology wireless communication systems may refer to systems in which UEs may be asynchronous, have different intercarrier spacing and/or have different cyclic prefix lengths. According to aspects of the present disclosure, tones for different numerologies may be aligned. A numerology may be based on a subcarrier spacing and a tone shift. As described herein, regardless of the numerology, the tones from the heterogeneous numerology wireless systems may be frequency-aligned.

Figure 21:
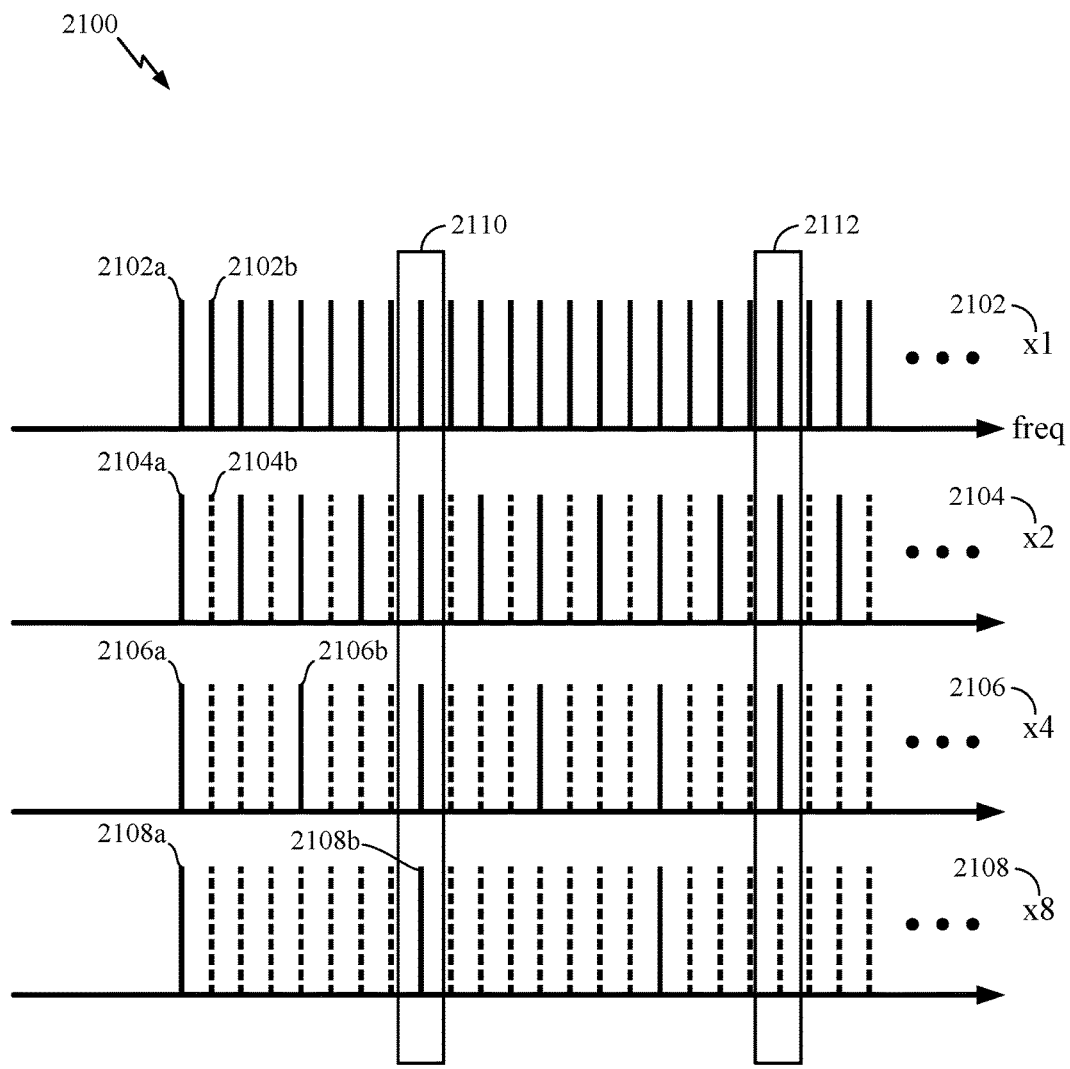
FIG. 21 illustrates an example tone alignment, according to aspects of the present disclosure.

FIG. 21 illustrates an example 2100 of tone alignment, according to aspects of the present disclosure. 2102 illustrates an example of a x1 subcarrier spacing, 2104 illustrates and example of a x2 subcarrier spacing, 2106 illustrates an example of a x4 subcarrier spacing, and 2108 illustrates an example of a x8 subcarrier spacing. As illustrated, the subcarrier spacing 2102-2108 are scaled. In other words, any larger subcarrier spacing is a multiple of the smaller subcarrier spacings.

In FIG. 21, the smallest subcarrier spacing may be x1, which may refer to, for example, a subcarrier spacing of 15 kHz. The next subcarrier spacing may be x2, which may refer to a subcarrier spacing of 30 kHz. A subcarrier spacing of x4 may refer to a subcarrier spacing of 60 kHz, and a subcarrier spacing of x8 may refer to a subcarrier spacing of 120 kHz. While not illustrated aspects of the present disclosure may also include a subcarrier spacing of x16 and so on.

2102 provides a tone alignment for the smallest illustrated subcarrier spacing (x1). As shown by 2102a and 2102b, every tone is used. At 2104, for the x2 subcarrier spacing, every other tone may be used, as shown at 2104a and 2104b. At 2106, for the x4 subcarrier spacing, every fourth tone may be used, as shown at 2106a and 2106b. At 2108, for the x8 subcarrier spacing, every eighth tone may be used, as shown at 2108a and 2108b.

In this manner, for different subcarrier spacings, tones may be aligned on a frequency grid, as shown, for example, at 2110. Thus, for scaled subcarrier spacings, tones available for use by a subcarrier spacing may be available for use for all subcarrier spacings associated with a smaller subcarrier spacing. In other words, a tone available for an x8 subcarrier spacings may also be available for subcarrier spacings of x1, x2, and x4, which are all associated with a smaller subcarrier spacing than the x8. Similarly, a tone available for use by an x4 subcarrier spacings may be available for an x2 and x1 subcarrier spacings, as shown at 2112.

According to aspects, a minimum subcarrier spacing may refer to a value or a range of values for bandwidth separation between tones. According to aspects, and as illustrated in FIG. 21 for example, the subcarrier spacing for each of 2104-2108 may be a multiple of a minimum subcarrier spacing.

Figure 22:
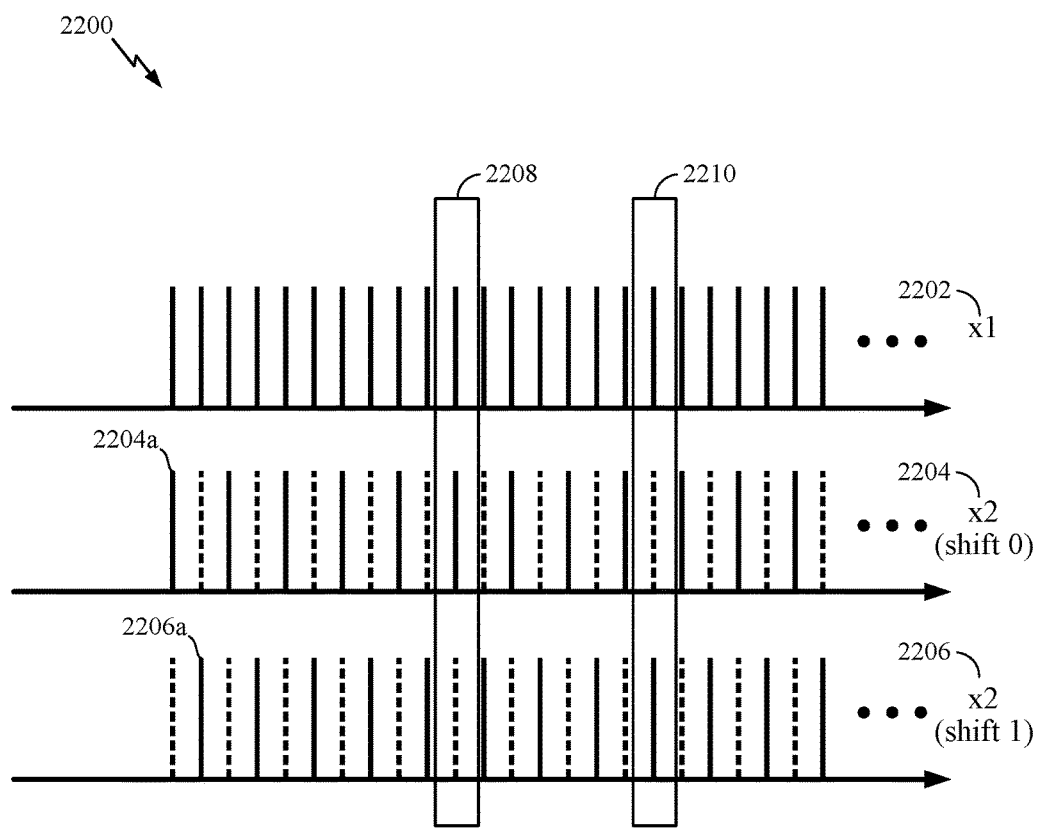
FIG. 22 illustrates an example tone alignment across numerologies, wherein a numerology includes a tone shift, according to aspect of the present disclosure.

FIG. 22 illustrates an example 2200 of tone alignment across numerologies, wherein a numerology includes a subcarrier spacing and a tone shift, according to aspect of the present disclosure. 2202 and 2204 may correspond to 2102 and 2104, respectively, in FIG. 21, described above. 2204 and 2206 each illustrate examples of tone alignment between an x2 subcarrier spacing and the x1 subcarrier spacing illustrated at 2202.

Whereas the first tone of 2204 begins with 2204a, the first tone of 2206 beings at 2206a. 2206a is shifted one tone relative to 2204a. In this manner, 2204 and 2206 illustrate example tone alignment (e.g., with respect to x1) wherein 2204 represents an x2 subcarrier spacing that is not shifted (e.g., shift 0) and 2206 represents an x2 subcarrier spacings that is shifted by 1 tone. As shown, the tones between the numerologies are frequency-aligned. For example, as shown at 2208, a tone available in x2 with a shift of 0 is available in x1 and, at 2210, a tone available in x2 with a shift of 1 is available in x1, wherein x1 is associated with a smaller subcarrier spacing than x2.

Figure 23:
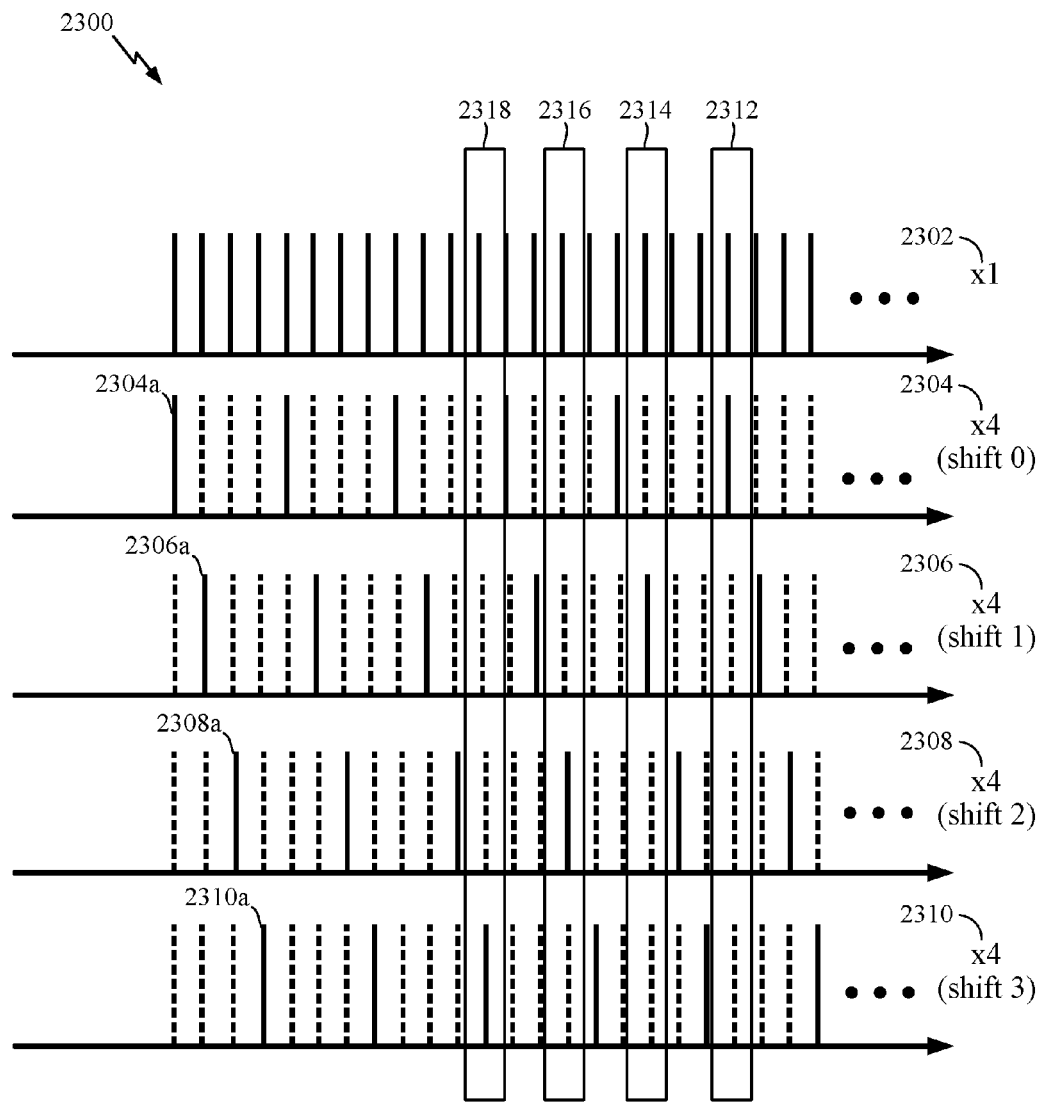
FIG. 23 illustrates an example tone alignment across numerologies wherein a numerology includes a tone shift, according to aspects of the present disclosure.

FIG. 23 illustrates an example 2300 of tone alignment across numerologies wherein a numerology includes a tone shift, according to aspects of the present disclosure. 2302 and 2304 may correspond to 2102 and 2108, respectively, from FIG. 21, described above. 2304-2310 illustrate examples of tone alignment with an x4 subcarrier spacing. The first tone of 2306 is shifted one tone relative to 2304, the first tone of 2308 is shifted two tones relative to 2304, and the first tone of 2310 is shifted three tones relative to 2304. Therefore, with an x4 subcarrier spacing (e.g., relative to x1 2302), each of the first tones 2304a, 2306a, 2308a, and 2310a are shifted as illustrated. Thereafter, every fourth tone is used, to maintain the x4 subcarrier spacing.

2312 illustrates an example tone alignment with x1 and x4 subcarrier spacing with a 0 shift, 2314 illustrates an example tone alignment with 1x and x4 subcarrier spacing with a shift of 1 tone, 2316 illustrates an example tone alignment with 1x subcarrier spacing and x4 subcarrier spacing with a shift of 2 tones, and 2318 illustrates an example tone alignment with 1x and x4 subcarrier spacing with a shift of 3 tones. In this manner, for scaled subcarrier spacing, the tones between numerologies may be aligned, wherein a numerology includes a tone shift.

According to aspects of the present disclosure, for a scaled subcarrier spacing, wherein each subcarrier spacing uses a single shift, the subcarrier spacing may be agreed upon between the transmitter and receiver (e.g., BS and UE). According to an example, the numerologies may refer to the subcarrier spacing (e.g., x1, x2, x4, and x8) and the tone shift, as described above. According to one example, no tone shift is possible for the system having the smallest subcarrier spacing (e.g., x1) because, for example, all of the tones may be used. When the remaining subcarrier spacings utilize only one shift, the BS may explicitly transmit the subcarrier spacing using a control channel. Alternatively, according to aspects, the UE may blindly detect or decode the subcarrier spacing.

For illustrative purposes, an example scenario where each subcarrier spacing uses a single shift may be: x1, x2, x4, and x8 all using a shift of 0 (e.g., as shown in FIG. 21). Another example may be: x1, x2 with a shift of 1, x4 with a shift of 1, and x8 with a shift of 3. Thus, the single shift used by a subcarrier spacing may be different than the shift used by another subcarrier spacing.

According to aspects of the present disclosure, for a scaled subcarrier spacing numerology, one or more numerologies may use multiple shifts. As described above, the 1x subcarrier spacing may not have a tone shift. The x2 subcarrier spacing may have a shift of 0 or 1 as illustrated in FIG. 22 and the x4 subcarrier spacing may have a shift of 0, 1, 2, or 3, as illustrated in FIG. 23. When the heterogeneous numerology systems use scaled subcarrier spacing with multiple possible shifts for at least one subcarrier spacing, both the subcarrier spacing and the shift in tones may be agreed upon between the transmitter and the receiver.

For illustrative purposes, an example scenario where each subcarrier spacing may use more than one shift may be: x1, x2 with a shift of 0, and x2 with a shift of 1, x4 with a shift of 0 and x4 with a shift of 1, and x4 with a shift of 2. Another example may be 1x, 2x with a shift of 0, 4x with a shift of 0, 4x with a shift of 2, 8x with a shift of 0, and 8x with a shift of 2. When multiple shifts are used for a subcarrier spacing, the BS may explicitly signal the subcarrier spacing and tone shift using control data. Alternatively, according to aspects, the UE may blindly decode the subcarrier spacing.

RB Definition

Aspects of the present disclosure provide definition for an RB that may be used for heterogeneous numerology systems. Providing definition for an RB may support NR systems which may communicate using subframes with different subcarrier spacings. Having an RB definition applicable to subframes with varying subcarrier spacings may be beneficial for scheduling UEs and communicating with one or more UEs in heterogeneous numerology systems.

Figure 24:
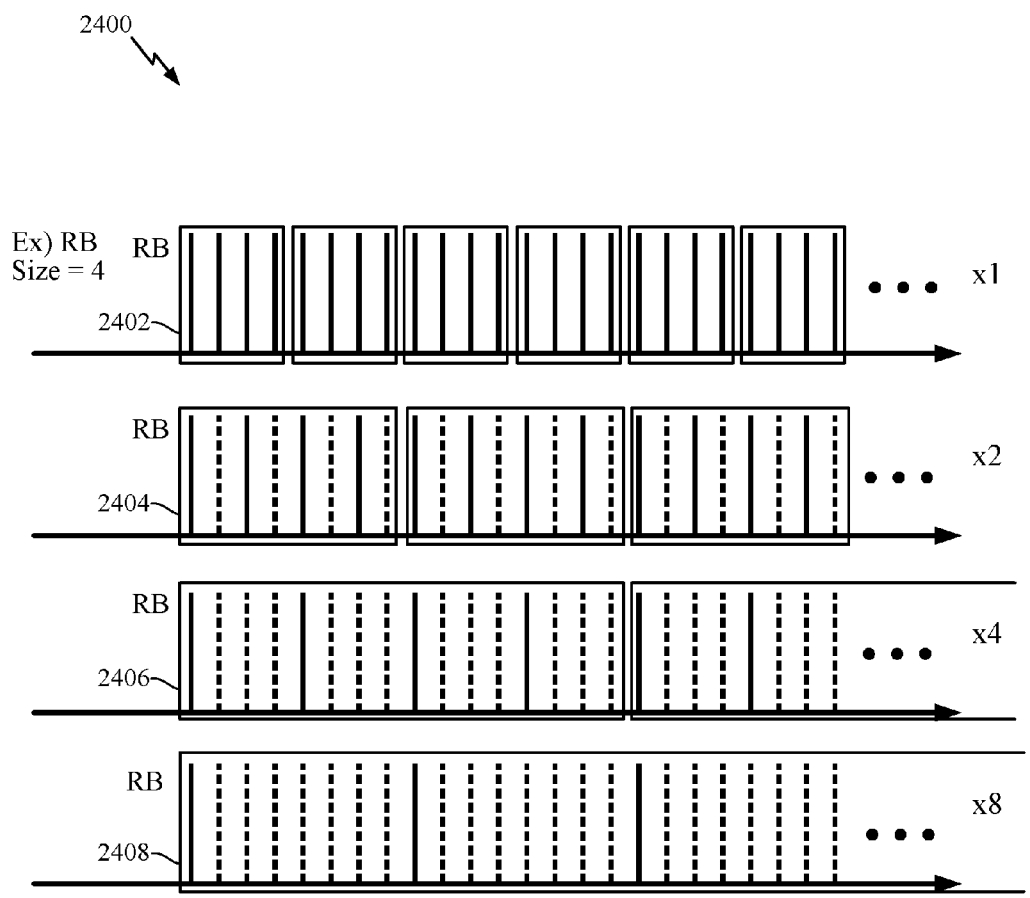
FIG. 24 illustrates an example RB definition according to aspects of the present disclosure.

FIG. 24 illustrates an example RB definition 2400 according to aspects of the present disclosure. As illustrated in FIG. 24, each of the subcarrier spacings uses a shift of 0. Accordingly, each RB 2402, 2404, 2406, and 2408 is shown with an RB size of 4 tones. In this manner, RBs may include the same number of tones (e.g., 4) for each of the x1, x2, x4, and x8 subcarrier spacings.

Figure 25:
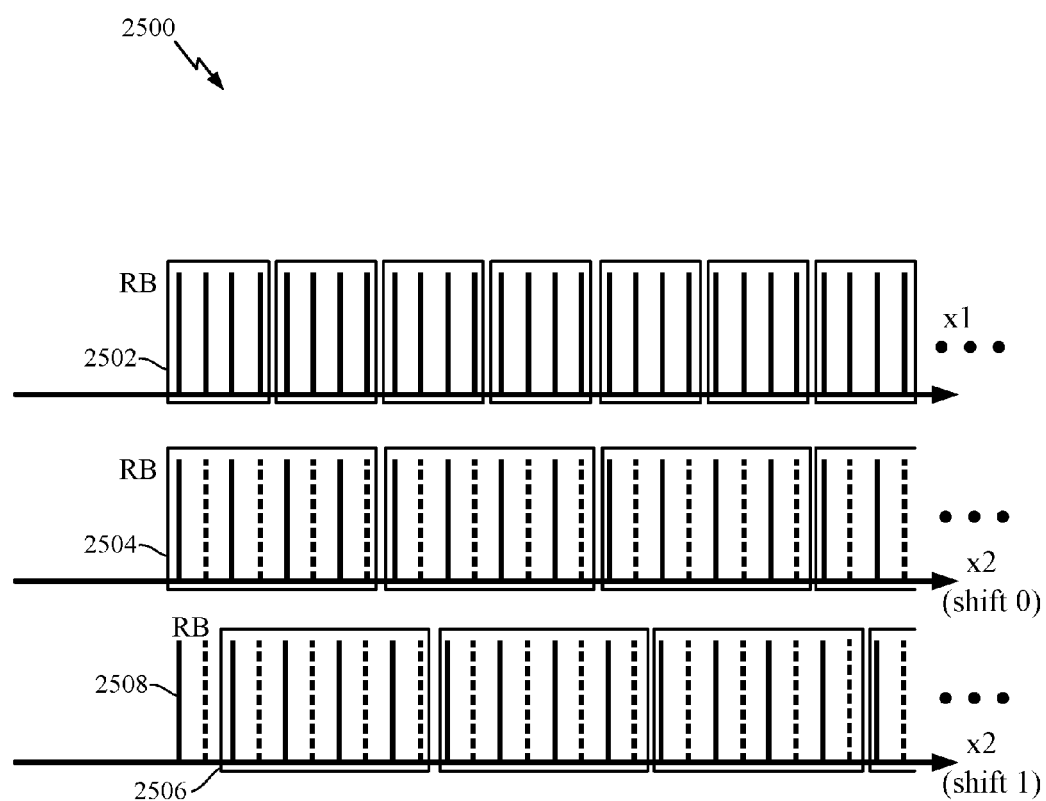
FIG. 25 illustrates an example RB definition incorporating tone shifts, according to aspects of the present disclosure.

FIG. 25 illustrates an example RB definition incorporating tone shifts 2500, according to aspects of the present disclosure. RBs 2502 and 2504 correspond to 2402 and 2404 in FIG. 24. Accordingly, RB 2502 illustrates an RB with a size of 4 tones for a x1 subcarrier spacing and RB 2504 illustrates an RB with a size of 4 tones for a x2 subcarrier spacing. Because RB 2504 of x2 subcarrier spacing begins with the first tone, the RB shift is zero. RB 2506 of x2 subcarrier spacing also includes four tones. RB 2506 begins with the second tone and includes the second, third, fourth, and fifth tone available in the x3 numerology. Accordingly, RB 2506 has a shift of 1 tone. For the x2 subcarrier spacing with a shift of 1 tone, the last RB will have one less tone, due to the tone 2508 not included in an RB for the x2 numerology with a tone shift of 1.

Figure 26:
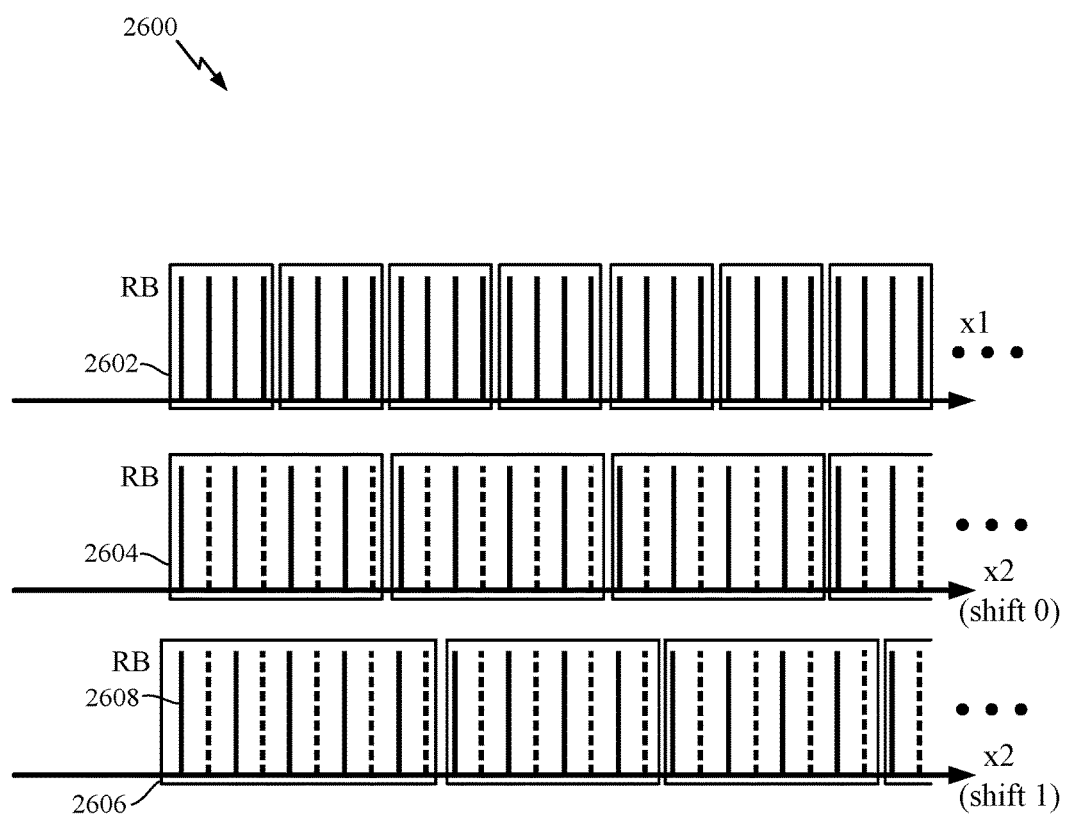
FIG. 26 illustrates an example RB definition incorporating tone shifts, according to aspects of the present disclosure.

FIG. 26 illustrates an example RB definition incorporating tone shifts 2600, according to aspects of the present disclosure. RBs 2602 and 2604 may correspond to RBs 2502 and 2504 in FIG. 25. For an x2 subcarrier spacing with a shift of 1 tone (e.g., 2506 in FIG. 25) a single tone will remain not assigned to a RB (e.g., 2508 in FIG. 25).

According to aspects, the first RB 2606 in the x2 subcarrier spacing with tone shift of 1 may be extended to include the "extra" tone 2608 (which corresponds to the unused tone 2508 in FIG. 25). Thus, the RB 2606 may have 5 tones. Accordingly, the last RB for the x2 subcarrier spacing with a shift of 1 may have only 3 tones. The remaining RBs of the x2 subcarrier spacing with a shift of 1 may have 4 tones. Similarly, for an x2 subcarrier spacing with a shift of 2 tones, the first RB may be extended by 2 tones, and may include 6 tones, and the last RB may only have 2 tones. Thus, according to aspects, all RBs other than the first and last RB may have the same number of tones.

Figure 27:
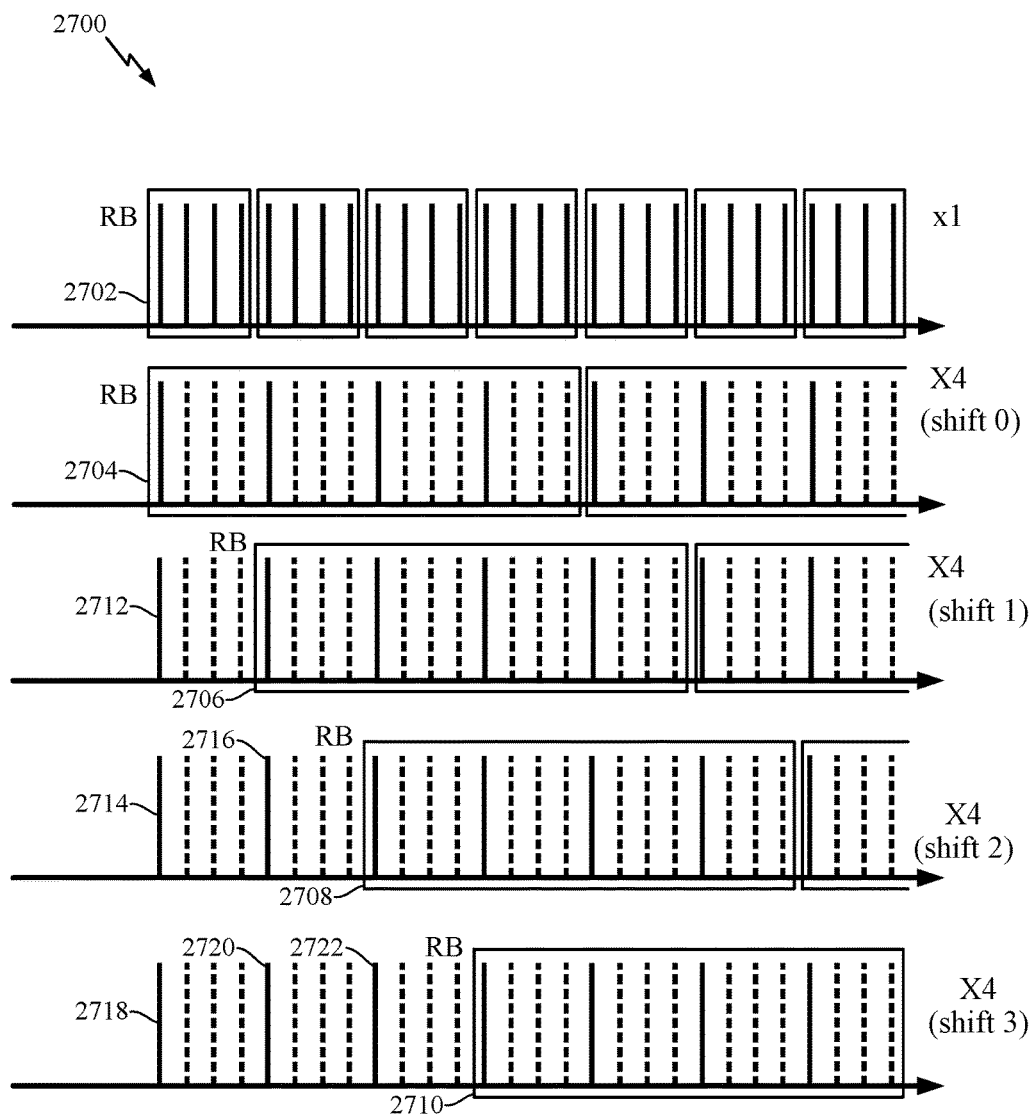
FIG. 27 illustrates an example RB definition, according to aspects of the present disclosure.

FIG. 27 illustrates an example RB definition 2700, according to aspects of the present disclosure. 2702 and 2704 may correspond to 2402 and 2406 in FIGS. 24. 2706, 2708, and 2710 illustrate example RBs of size 4 in the x4 subcarrier spacing with a tone shift. The RB is shifted by a single tone at 2706, by two tones at 2708, and by 3 tones at 2710. Thus, as illustrated tones 2712, 2714, 2716, 2718, 2720, and 2722 may not be assigned to an RB.

Figure 28:
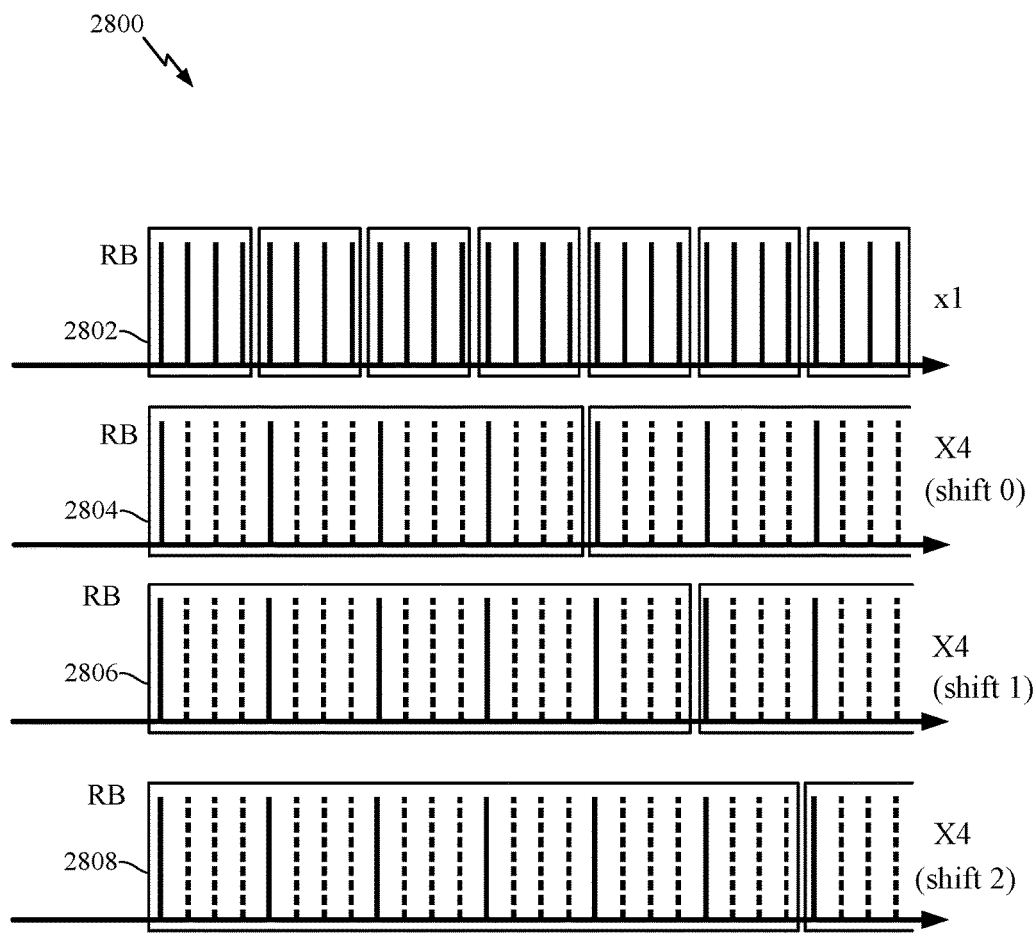
FIG. 28 illustrates an example RB definition, according to aspects of the present disclosure.

FIG. 28 illustrates an example RB definition 2800, according to aspects of the present disclosure. 2802 and 2804 correspond to 2702 and 2704 in FIGS. 27 and 2402 and 2406 in FIGS. 24. 2806 and 2808 illustrate example RBs of size 4 with a tone shift. When the RB is shifted by a single tone (2706 in FIG. 27), the first RB 2806 of the x2 subcarrier spacing may be extended to include an extra tone, such that all tones are assigned to a RB. Similarly, when the RB is shifted by two tones, the first RB of the x2 subcarrier spacing may include two extra tones, such that the RB 2808 includes 6 tones.

DC Shift

According to aspects, the BS may avoid transmitting signals (e.g., non-zero signals) on a DC tone. The subcarrier whose frequency would be equal to the RF center frequency of the station (e.g., for FFT) may be the DC tone. In an effort to avoid sending a non-zero signal at the DC tone, aspects of the disclosure may puncture the DC tone.

Figure 29:
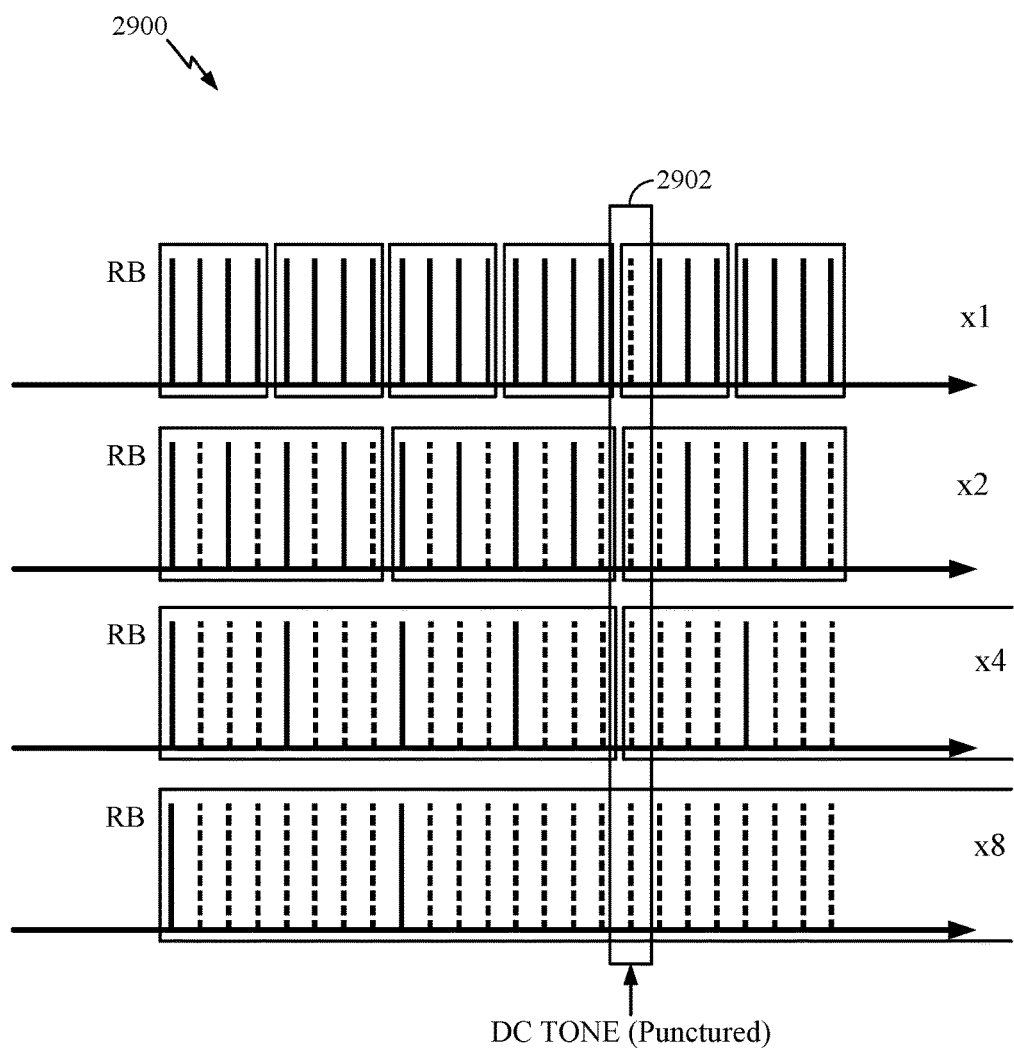
FIG. 29 illustrates an example of puncturing the DC tone, according to aspects of the present disclosure.

FIG. 29 illustrates an example of puncturing the DC tone 2900, according to aspects of the present disclosure. 2902 illustrates the DC tone. As shown, the DC tone may be punctured such that a signal is not transmitted on the DC tone. In other words, no transmission will occur on the DC tone in any of the illustrated RBs, due to puncturing of tones. Stated otherwise, the DC tone was available for use in each of the illustrated subcarrier spacings (with zero shift). To avoid a non-zero transmission, the DC tone was punctured in each of the x1, x2, x4, and x8 subcarrier spacings as shown at 2902.

As described above, in an effort to avoid transmitting non-zero data at the DC tone, the DC tone may be punctured. According to aspects, the tones may be shifted such that puncturing the DC tone may not be necessary for all numerologies. In other words, the tones may be frequency aligned such that a set of tones defined by a numerology lack a transmissions the DC location, in an effort to limit puncturing on the DC tone.

Figure 30:
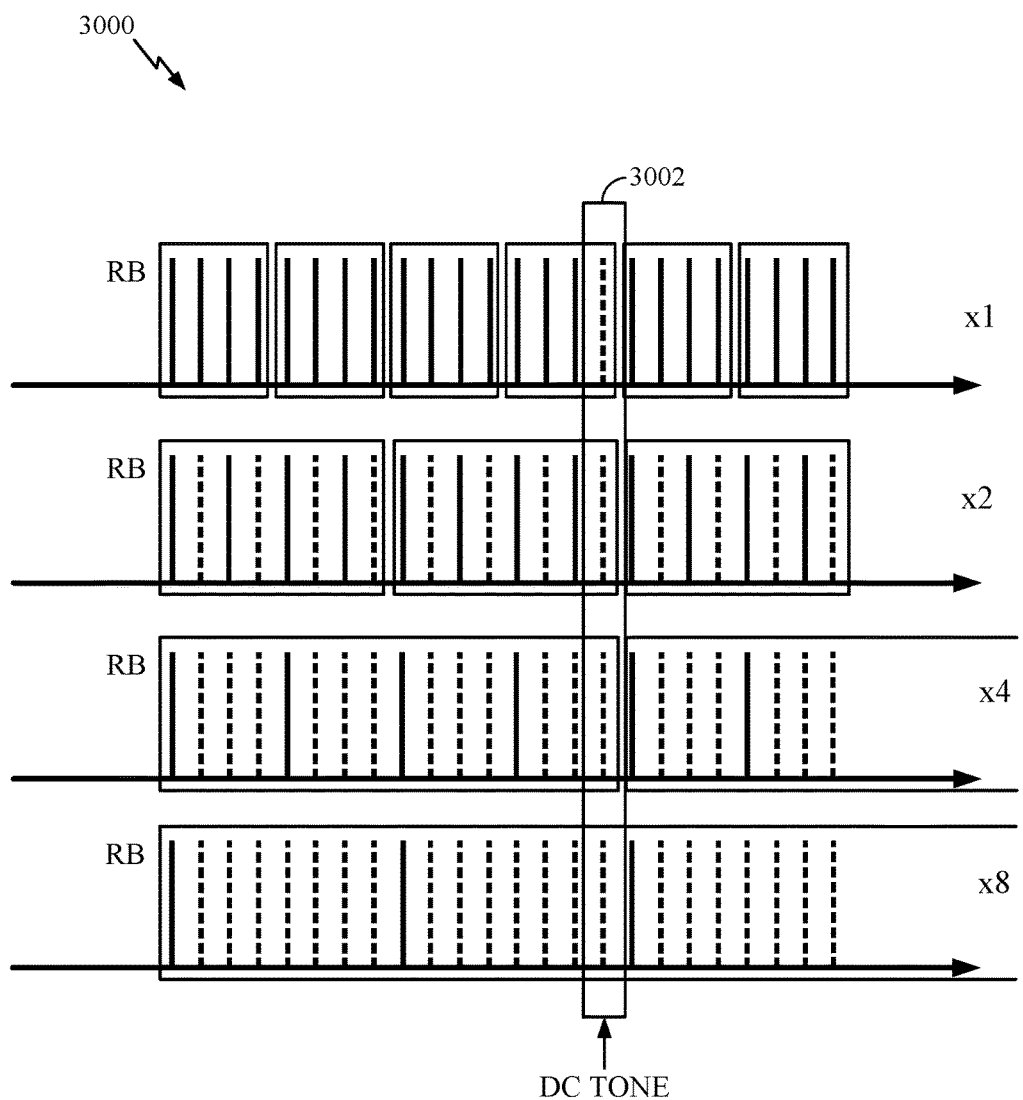
FIG. 30 illustrates an example tone alignment, according to aspects of the present disclosure.

FIG. 30 illustrates an example tone alignment 3000, according to aspects of the present disclosure. 3002 illustrates the DC tone across the x1, x2, x4, and x8 subcarrier spacing with 0 shift. As shown, due to the tone alignment, only the DC tone in the x1 subcarrier spacing would be punctured so that a signal is not transmitted on the DC tone. For example, no puncturing would be necessary for the DC tone in the x2, x4, and x8 subcarrier spacing because tones are aligned such that the DC tone is not occupied based on the tone assignment. Aspects of the present disclosure shift the tone assignment in an effort to reduce the puncturing of the DC tone.

Figure 31:
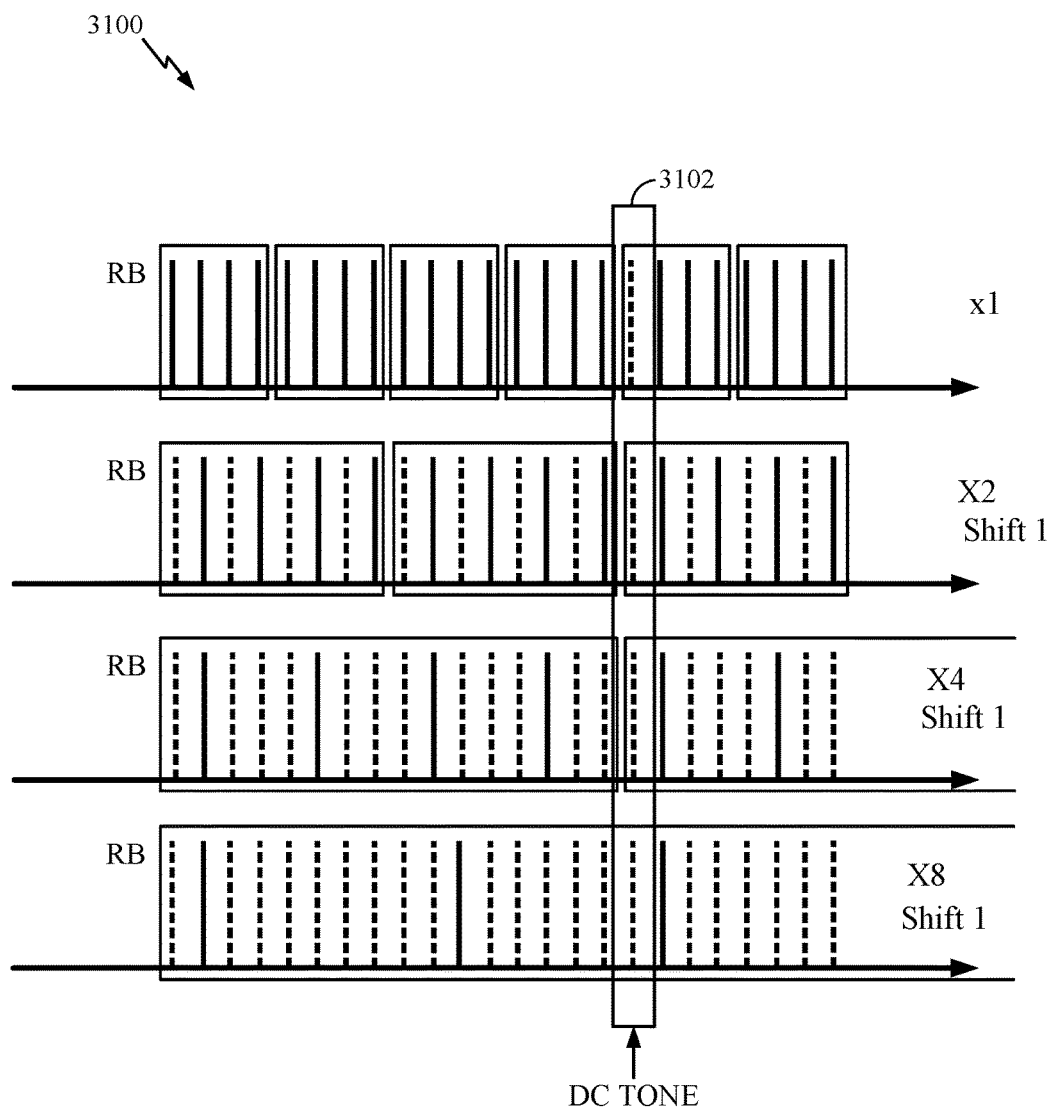
FIG. 31 illustrates an example of tone alignment, according to aspects of the present disclosure.

FIG. 31 illustrates an example of tone alignment 3100, according to aspects of the present disclosure. Due to the tone alignment, only the DC tone in the x1 numerology may be punctured to avoid transmission on the DC tone across all illustrated numerologies. As described above with reference to FIG. 30, the tones may be shifted such that the DC tone is not available for transmission in the illustrated numerologies of subcarrier spacings of x2, x4, and x8 with no tone shift.

Aspects described herein may advantageously be used for tone alignment and RB management for heterogeneous numerology systems, in an effort to support systems having different subcarrier spacing.

FIG. 32 illustrates example operations 3200 that may be performed by a BS, according to aspects of the present disclosure. The BS may be BS 110a in FIG. 1, which may include one or more components illustrated in FIG. 4. According to aspects, the BS may be the BS illustrated in FIG. 37, including one or more components configured to perform the operations described herein.

At 3202, the BS may identify, from a set of subcarrier spacings that are associated with a minimum subcarrier spacing, a subcarrier spacing for communicating with a UE. At 3204, the BS may determine a numerology for the identified subcarrier spacing, the numerology defining a set of tones available for communicating with the UE and determined based at least on the identified subcarrier spacing and a grid of tone locations associated with the minimum subcarrier spacing. At 3206, the BS may communicate with the UE using the set of tones defined by the numerology.

The BS may transmit an indication of the identified subcarrier spacing to the UE. Additionally or alternatively, the BS may receive an indication of the subcarrier spacing from the UE. According to aspects, the BS may identify a shift value associated with the identified subcarrier spacing. The numerology may be determined based on the shift value and the subcarrier spacing.

The shift value maybe selected from a set of available shift values available for the identified subcarrier spacing. For example, for a subcarrier spacing of x4, the available shift values may be 0, 1, 2, and 3. For a subcarrier spacing of x8 the available shift values may be 0, 1, 2, 3, 4, 5, 6, and 7. The BS may transmit an indication of the identified shift value to the UE. Additionally or alternatively, the BS may receive an indication of the identified shift value from the UE.

FIG. 33 illustrates example operations 3300 that may be performed by a UE, according to aspects of the present disclosure. The UE may be UE 120a in FIG. 1, which may include one or more components illustrated in FIG. 4. According to aspects, the UE may be the UE illustrated in FIG. 36, including one or more components configured to perform the operations described herein.

At 3302, the UE may identify, from a set of subcarrier spacings that are associated with a minimum subcarrier spacing, a subcarrier spacing for communicating with a BS. At 3304, the UE may determine a numerology for the identified subcarrier spacing, the numerology defining a set of tones available for communicating with the BS and determined based at least on the identified subcarrier spacing and a grid of tone locations associated with the minimum subcarrier spacing. At 3306, the UE may communicate with the BS using the set of tones defined by the numerology.

The subcarrier spacing may be identified based on an indication received from the BS. Additionally or alternatively, the UE may transmit an indication of the subcarrier spacing from the UE. According to aspects, the UE may blindly decode or detect the subcarrier spacing.

The UE may identify a shift value associated with the identified subcarrier spacing. The UE may receive an indication of the shift value from the BS. According to aspects, the UE may transmit an indication of the identified shift value to the BS. According to aspects, the numerology may be determined based, at least in part, on the identified shift value.

FIG. 34 illustrates example operations 3400 that may be performed by a BS, according to aspects of the present disclosure. The BS may be BS 110a in FIG. 1, which may include one or more components illustrated in FIG. 4. According to aspects, the BS may be the BS illustrated in FIG. 37, including one or more components configured to perform the operations described herein.

At 3402, the BS may identify, from a set of subcarrier spacings that are associated with of a minimum subcarrier spacing, a subcarrier spacing for communicating with a UE. At 3404, the BS may determine a numerology for the identified subcarrier spacing, the numerology defining a set of tones available for communicating with the UE and determined based at least on the identified subcarrier spacing and a grid of tone locations associated with the minimum subcarrier spacing. At 3406, the BS may communicate with the UE using RBs, wherein each RB includes a subset of the set of tones defined by the determined numerology.

As described and illustrated above, a plurality of RBs defined by a numerology may each include a same number of tones. Based, at least in part, on a shift associated with the RB and a shift associated with the set of tones, a first and last RB of a numerology may include a different number of tones. Accordingly, at least first and second RBs may each include a same first number of tones. A third RB may include a second number of tones. A fourth RB may include a third number of tones.

The BS may transmit an indication of the identified subcarrier spacing to the UE. Additionally or alternatively, the BS may receive an indication of the identified subcarrier spacing from the UE.

According to aspects, the BS may identify one or more shift values. For example, the BS may identify a first shift value associated with the set of tones. The BS may identify a second shift value associated with a RB which defines which of the tones are in the RB. The numerology may be determined based, at least in part, on the identified shift values. The BS may also transmit an indication of the identified shift value to the UE. Additionally or alternatively, the BS may receive an indication of the identified shift value from the UE.

Figure 35:
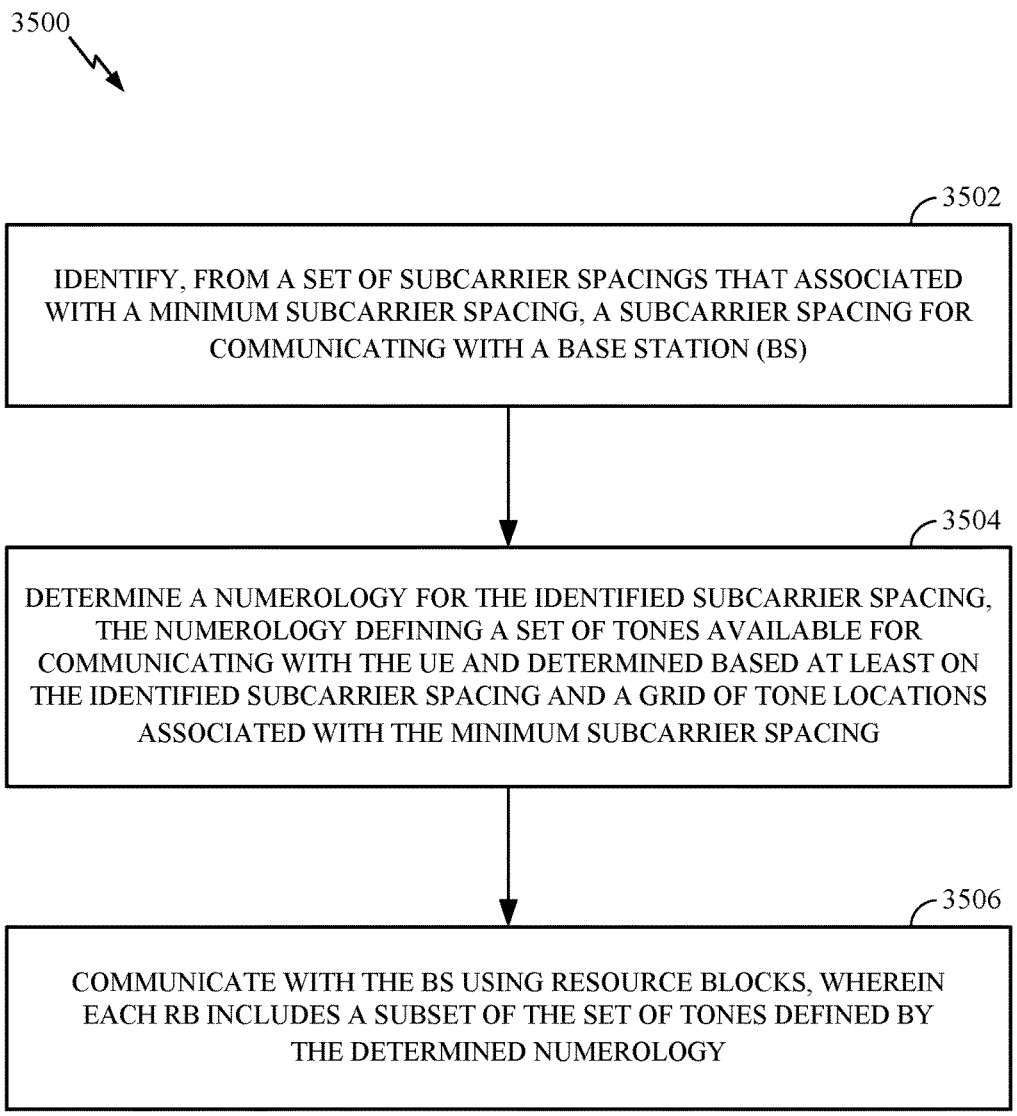
FIG. 35 is a flowchart illustrating example operations for wireless communications by a UE, according to aspects of the present disclosure.

FIG. 35 illustrates example operations 3500 that may be performed by a UE, according to aspects of the present disclosure. The UE may be UE 120a in FIG. 1, which may include one or more components illustrated in FIG. 4. According to aspects, the UE may be the UE illustrated in FIG. 36, including one or more components configured to perform the operations described herein.

At 3502, the UE may identify, from a set of subcarrier spacings that are associated with a minimum subcarrier spacing, a subcarrier spacing for communicating with a BS. At 3504, the UE may determine a numerology for the identified subcarrier spacing, the numerology defining a set of tones available for communicating with the UE and determined based at least on the identified subcarrier spacing and a grid of tone locations associated with the minimum subcarrier spacing. At 3506, the UE may communicate with the BS using RBs, wherein each RB includes a subset of the set of tones defined by the determined numerology.

As described above, a plurality of RBs defined by the numerology may each include a same number of tones. Based, at least in part, on a shift associated with the RB and a shift associated with the set of tones, a first and last RB of a numerology may include a different number of tones. Accordingly, at least first and second RBs may each include a same first number of tones. A third RB may include a second number of tones. A fourth RB may include a third number of tones.

According to aspects, the subcarrier spacing may be identified based on an indication received from the BS. Additionally or alternatively, the UE may transmit an indication of the identified subcarrier spacing to the BS. The subcarrier spacing may be blindly decoded/detected by the UE. An indication of the shift value may be received by the UE from the BS. Additionally or alternatively, the UE may transmit an indication of the identified shift value to the BS.

Figure 36:
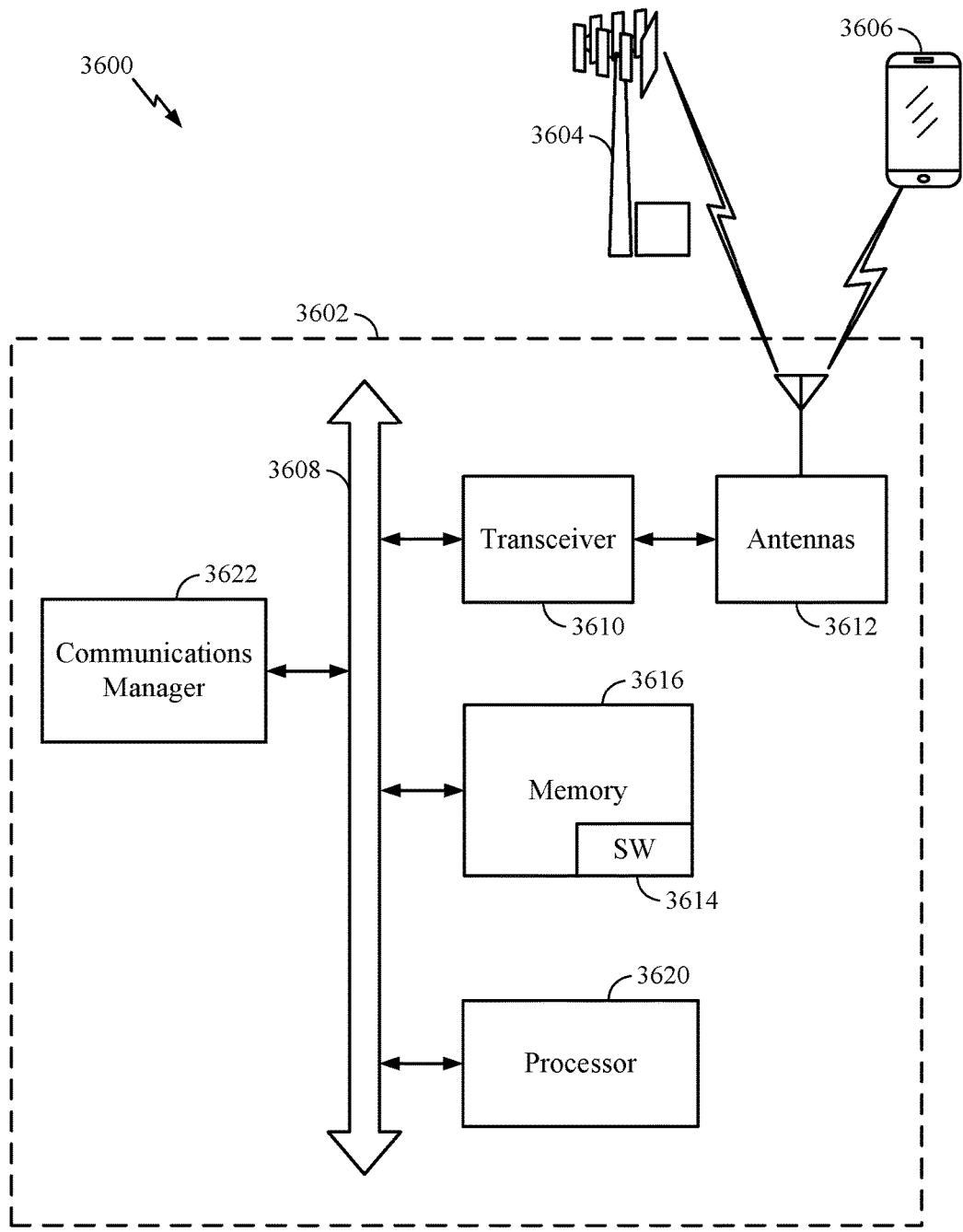
FIG. 36 illustrates a block diagram of a system including a UE configured to operate in a wireless communication environment supporting heterogeneous numerologies, according to aspects of the present disclosure.

FIG. 36 illustrates an example system 3600 of a UE configured to transmit a receive signals in GB in a heterogeneous numerology environment, as described herein. System 3600 may include UE 3602, which may be an example of a UE described above with reference to FIGS. 1 and 4 which may be configured to perform the operations described herein as illustrated in FIGS. 10, 33, and 35.

UE 3602 may include a communication manager module 3622, which may be configured to control a transmit power of at least one tone transmitted in a GB. The communication manager 3622 may additionally be configured to adjust a MCS of at least one tone transmitted in the GB. The UE 3602 may also include components for bi-directional voice and data communications including components for transmitting communications and components for receiving communications. For example, UE 3602 may communicate bi-directionally with UE 1706 or base station 1704.

UE 3602 may also include a processor module 3620, and memory 3616 (including software (SW) 3614), a transceiver module 3610, and one or more antenna(s) 3612, each of which may communicate, directly or indirectly, with one another (e.g., via buses 3608). The transceiver module 3610 may communicate bi-directionally, via the antenna(s) 3612 or wired or wireless links, with one or more networks, as described above. For example, the transceiver module 3610 may communicate bi-directionally with a base station 3604 or another UE 3606. The transceiver module 3610 may include a modem to modulate the packets and provide the modulated packets to the antenna(s) 3612 for transmission, and to demodulate packets received from the antenna(s) 3612. While the UE 3602 may include a single antenna 3612, the UE 3602 may also have multiple antennas 3612 capable of concurrently transmitting or receiving multiple wireless transmissions.

The memory 3616 may include random access memory (RAM) and read only memory (ROM). The memory 3616 may store computer-readable, computer-executable software/firmware code including instructions that, when executed, cause the processor module 3620 to perform various functions described herein (e.g., transmitting and receiving one or more tones in a GB). Alternatively, the software/firmware code may not be directly executable by the processor module 3620 but cause a computer (e.g., when compiled and executed) to perform functions described herein. The processor module 3620 may include an intelligent hardware device (e.g., a central processing unit (CPU), a microcontroller, an ASIC, etc.).

Figure 37:
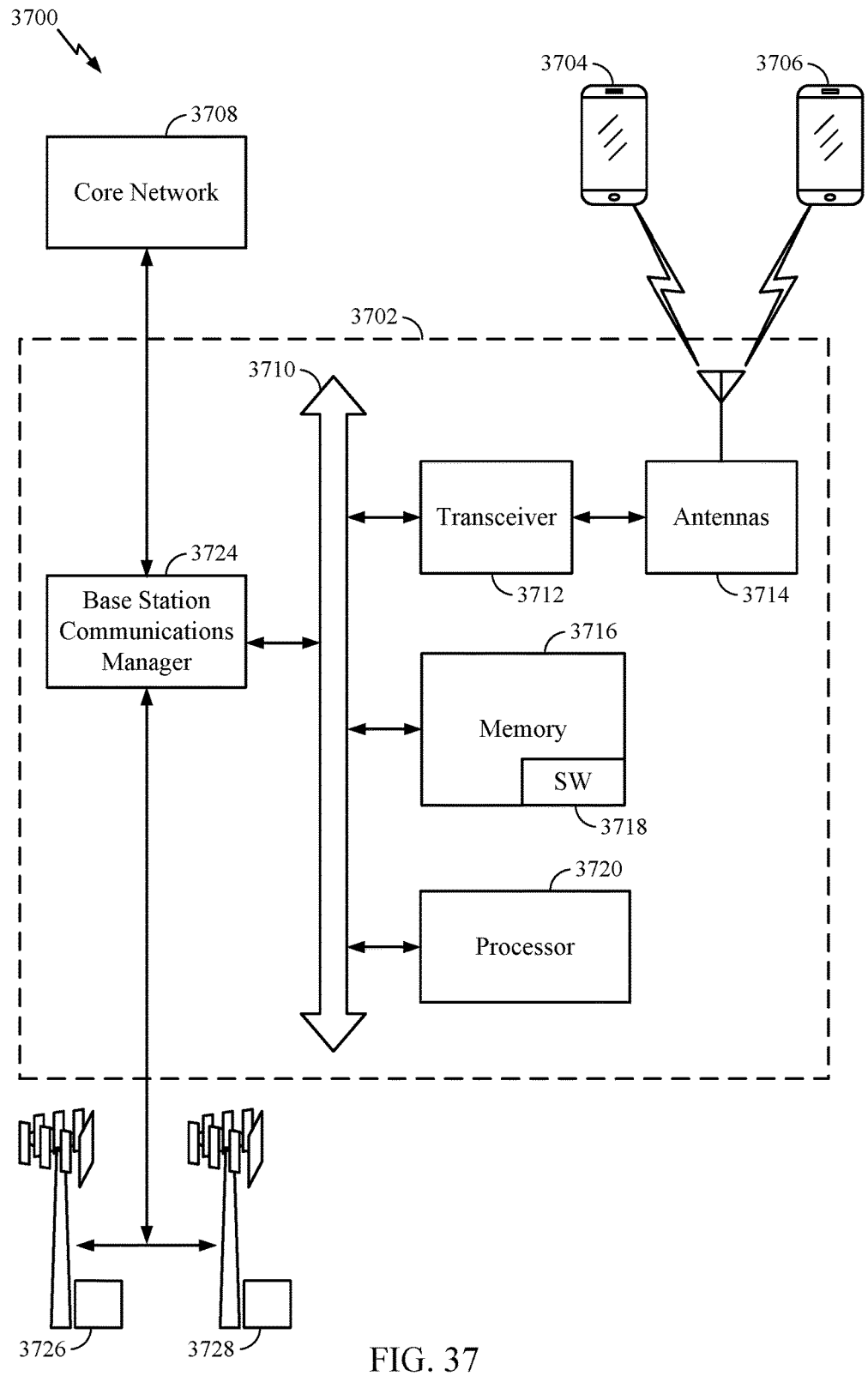
FIG. 37 illustrates a block diagram of a system including a BS configured to operate in a wireless communication environment supporting heterogeneous numerologies, according to aspect of the present disclosure.

FIG. 37 illustrates an example of a system 3700 including a base station configured transmitting and/or receiving signals in a GB in a heterogeneous numerology wireless communication environment in accordance with various aspects of the present disclosure. System 3700 may include base station 3702, which may be an example of a base station described above with reference to FIGS. 1 and 4 which may be configured to perform the operations described herein as illustrated in FIGS. 9, 32, and 34.

Base station 3702 may include communications manager module 3724. Base station 3702 may also include components for bi-directional voice and data communications including components for transmitting communications and components for receiving communications. For example, base station 3702 may communicate bi-directionally with UE 3704 or UE 3706.

In some cases, base station 3702 may have one or more wired backhaul links. Base station 3702 may have a wired backhaul link (e.g., S1 interface, etc.) to the core network 1808. Base station 3702 may also communicate with other base stations, such as base station 3726 and base station 3728 via inter-base station backhaul links (e.g., an X2 interface). Each of the base stations may communicate with UEs 3704 and 3706 using the same or different wireless communications technologies. In some cases, base station 3702 may communicate with other base stations such as 3726 or 3728 utilizing base station communications manager module 3724. In some embodiments, base station communications module 3724 may provide an X2 interface within an LTE/LTE-A wireless communication network technology to provide communication between some of the base stations. In some aspects, base station 3702 may communicate with other base stations through core network 3708. In some cases, base station 3702 may communicate with the core network 3708 through network communications module 3724.

The base station 3702 may include a processor module 3720, memory 3716 (including software (SW) 3718), transceiver modules 3712, and antenna(s) 3714, which each may be in communication, directly or indirectly, with one another (e.g., over bus system 3710). The transceiver modules 3712 may be configured to communicate bi-directionally, via the antenna(s) 3714, with the UEs 3704, 3706, which may be multi-mode devices. The transceiver module 3712 (or other components of base station) may also be configured to communicate bi-directionally, via the antennas 3714, with one or more other base stations (not shown). The transceiver module 13712 may include a modem configured to modulate the packets and provide the modulated packets to the antennas for transmission, and to demodulate packets received from the antennas 3714. The base station may include multiple transceiver modules 3712, each with one or more associated antennas 3714. The transceiver module may be an example of a combined receiver and transmitter.

The memory 3716 may include RAM and ROM. The memory 3716 may also store computer-readable, computer-executable software code 3718 containing instructions that are configured to, when executed, cause the processor module 3720 to perform various functions described herein (e.g., communicating during GB). Alternatively, the software code 3718 may not be directly executable by the processor module 3720 but be configured to cause the computer (e.g., when compiled and executed), to perform functions described herein. The processor module 3720 may include an intelligent hardware device, (e.g., a CPU, a microcontroller, an ASIC, etc.). The processor module 3720 may include various special purpose processors such as encoders, queue processing modules, base band processors, radio head controllers, digital signal processor (DSPs), and the like. The base station communications module 3724 may manage communications with other base stations 3726, 3728.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to aspects, the means for transmitting, means for receiving may be performed by the transceiver 3712 and antenna 3714 at the BS or the transceiver 3610 and antenna 3612 at the UE. The means for controlling and the means for reducing may be performed by the communication manager module 3622 at the UE or the module 3722 at the BS. Additionally or alternatively, the means may be performed by one or more modules illustrated in FIG. 4. For example, the transceiver 432 and antenna 434 at the BS 110 or the transceiver 454 and the antenna 452 at the UE 120 may perform the means for transmitting and/or the means for receiving. One or more of the processors at the UE 120 or the BS 110 may perform the means for controlling and means for reducing in accordance with the techniques described herein.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS) comprising:
transmitting a first signal using a first group of one or more tones having a first subcarrier spacing;
transmitting a second signal using a second group of one or more tones having a second subcarrier spacing, wherein the first subcarrier spacing is a multiple of the second subcarrier spacing; and
transmitting a third signal using a third group of one or more tones in a guard band between the first and second groups of tones,
wherein the transmitting the third signal comprises controlling a transmit power of at least one tone of the third group of one or more tones in the guard band, the at least one tone of the third group of tones being on a different frequency grid than the first group of one or more tones or the second group of one or more tones, wherein controlling the transmit power comprises reducing the transmit power of the at least one tone.

2. The method of claim 1,
wherein the first subcarrier spacing is twice as large as the second subcarrier spacing, and
wherein controlling the transmit power comprises reducing the transmit power on every other tone of the third signal.

3. The method of claim 1, wherein transmitting the third signal comprises:
varying a modulation and coding scheme for at least the one tone of the third group of one or more tones in the guard band based, at least in part, on a frequency proximity to at least one of the first or second group of tones.

4. The method of claim 1, wherein transmitting the third signal comprises:
synchronizing one or more tones in the third group of tones in the guard band with at least one of the first group of tones or the second group of tones, wherein the synchronizing comprises matching at least one of symbol length, cyclic prefix length, symbol boundary, subframe boundary, or sub carrier spacing of the third group of tones with one of the first or second group of tones.

5. The method of claim 1, wherein controlling the transmit power comprises:
reducing the transmit power of the tones in the guard band which are adjacent to at least one of the first or second groups of tones.

6. The method of claim 1, wherein symbols occupying the first group of tones have a first symbol length and symbols occupying the second group of tones have a second symbol length.

7. The method of claim 1, wherein symbols occupying the first group of tones have a first cyclic prefix length and symbols occupying the second group of tones have a second cyclic prefix length.

8. The method of claim 1, further comprising:
identifying, from a set of subcarrier spacings that are associated with a minimum subcarrier spacing, a subcarrier spacing for communicating with a user equipment (UE);
determining a numerology for the identified subcarrier spacing, the numerology defining a set of tones available for communicating with the UE and determined based at least on the identified subcarrier spacing and a grid of tone locations associated with the minimum subcarrier spacing; and
transmitting an indication of the determined numerology to the UE.

9. The method of claim 1,
wherein the first group of one or more tones is transmitted to a first user equipment (UE) using a first group of resource blocks (RBs) having a first subcarrier spacing,
wherein the second group of one or more tones is transmitted to a second UE using a second group of RBs having a second subcarrier spacing, and
wherein each of the first and second group of RBs includes a subset of tones determined based at least on a respective identified subcarrier spacing and a grid of tone locations associated with a minimum subcarrier spacing associated with the first or second UE.

10. The method of claim 1, wherein:
the first group of one or more tones are associated with a first frequency grid defined, at least in part, by the first subcarrier spacing;
the second group of one or more tones are associated with a second frequency grid defined, at least in part, by the second subcarrier spacing; and
the third group of one or more tones are associated with a third frequency grid defined, at least in part, by a subcarrier spacing different than the first subcarrier spacing or the second subcarrier spacing.

11. The method of claim 10, wherein the third frequency grid is defined, at least in part, by the first subcarrier spacing or the second subcarrier spacing.

12. A method for wireless communication by a third user equipment (UE), comprising:
receiving information regarding a first signal transmitted by a first UE on a first group of one or more tones having a first subcarrier spacing;
receiving information regarding a second signal transmitted by a second UE on a second group of one or more tones having a second subcarrier spacing, wherein the first subcarrier spacing is a multiple of the second subcarrier spacing; and
transmitting, by the third UE, a third signal using a third group of one or more tones in a guard band between the first and second groups of tones,
wherein the transmitting comprises controlling a transmit power of at least one tone of the third group of one or more tones in the guard band, the at least one tone of the third group of tones being on a different frequency grid than the first group of one or more tones or the second group of one or more tones, wherein controlling the transmit power comprises reducing the transmit power of the at least one tone.

13. The method of claim 12,
wherein the first subcarrier spacing is twice as large as the second subcarrier spacing, and
wherein controlling the transmit power comprises reducing the transmit power on every other tone of the third signal.

14. The method of claim 12, wherein transmitting the third signal comprises:
varying a modulation and coding scheme for at least the one tone of the third group of one or more tones in the guard band based, at least in part, on a frequency proximity to at least one of the first or second group of tones.

15. The method of claim 12, wherein transmitting the third signal comprises:
synchronizing one or more tones in the third group of tones in the guard band with at least one of the first group of tones or the second group of tones, wherein the synchronizing comprises matching at least one of symbol length, cyclic prefix length, symbol boundary, subframe boundary, or sub carrier spacing of the third group of tones with one of the first or second group of tones.

16. The method of claim 12, wherein controlling the transmit power comprises:
reducing the transmit power of the tones in the guard band which are adjacent to at least one of the first or second groups of tones.

17. The method of claim 12, wherein symbols occupying the first group of tones have a first symbol length and symbols occupying the second group of tones have a second symbol length.

18. The method of claim 12, wherein symbols occupying the first group of tones have a first cyclic prefix length and symbols occupying the second group of tones have a second cyclic prefix length.

19. The method of claim 12, further comprising:
identifying, from a set of subcarrier spacings that are associated with a minimum subcarrier spacing, a subcarrier spacing for communicating with a base station (BS);
determining a numerology for the identified subcarrier spacing, the numerology defining a set of tones available for communicating with the BS and determined based at least on the identified subcarrier spacing and a grid of tone locations associated with the minimum subcarrier spacing; and
transmitting an indication of the determined numerology to the BS.

20. The method of claim 12,
wherein the third group of one or more tones is transmitted to a base station (BS) using at least one resource block (RB) having a subcarrier spacing,
wherein at least one of the RB includes a subset of tones determined based at least on the subcarrier spacing and a grid of tone locations associated with a minimum subcarrier spacing associated with the third UE.

21. The method of claim 12, wherein:
the first group of one or more tones are associated with a first frequency grid defined, at least in part, by the first subcarrier spacing;
the second group of one or more tones are associated with a second frequency grid defined, at least in part, by the second subcarrier spacing; and
the third group of one or more tones are associated with a third frequency grid defined, at least in part, by a subcarrier spacing different than the first subcarrier spacing or the second subcarrier spacing.

22. The method of claim 21, wherein the third frequency grid is defined, at least in part, by the first subcarrier spacing or the second subcarrier spacing.

23. An apparatus for wireless communication by a base station (BS) comprising:
means for transmitting a first signal using a first group of one or more tones having a first subcarrier spacing;
means for transmitting a second signal using a second group of one or more tones having a second subcarrier spacing, wherein the first subcarrier spacing is a multiple of the second subcarrier spacing; and
means for transmitting a third signal using a third group of one or more tones in a guard band between the first and second groups of tones;
wherein the means for transmitting the third signal comprises means for controlling a transmit power of at least one tone of the third group of one or more tones in the guard band, the at least one tone of the third group of tones being on a different frequency grid than the first group of one or more tones or the second group of one or more tones, wherein controlling the transmit power comprises reducing the transmit power of the at least one tone.

24. The apparatus of claim 23,
wherein the first subcarrier spacing is twice as large as the second subcarrier spacing, and
wherein the means for controlling the transmit power comprises means for reducing the transmit power on every other tone of the third signal.

25. An apparatus for wireless communication by a third user equipment (UE), comprising:
means for receiving information regarding a first signal transmitted by a first UE on a first group of one or more tones having a first subcarrier spacing;
means for receiving information regarding a second signal transmitted by a second UE on a second group of one or more tones having a second subcarrier spacing, wherein the first subcarrier spacing is a multiple of the second subcarrier spacing; and
means for transmitting, by the third UE, a third signal using a third group of one or more tones in a guard band between the first and second groups of tones,
wherein the means for transmitting comprises means for controlling a transmit power of at least one tone of the third group of one or more tones in the guard band, the at least one tone of the third group of tones being on a different frequency grid than the first group of one or more tones or the second group of one or more tones, wherein controlling the transmit power comprises reducing the transmit power of the at least one tone.

26. The apparatus of claim 25,
wherein the first subcarrier spacing is twice as large as the second subcarrier spacing, and
wherein the means for controlling the transmit power comprises means for reducing the transmit power on every other tone of the third signal.

* * * * *